(12) United States Patent
Tin

(10) Patent No.: US 8,207,982 B2
(45) Date of Patent: Jun. 26, 2012

(54) FAST GAMUT CHECKING AND INVERSION OF SPECTRAL COLORS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 511 days.

(21) Appl. No.: 12/435,402

(22) Filed: May 4, 2009

(65) Prior Publication Data

US 2010/0277493 A1 Nov. 4, 2010

(51) Int. Cl.
*G09G 5/02* (2006.01)
*G06K 9/00* (2006.01)
*G06K 1/00* (2006.01)
*G06F 15/00* (2006.01)
*G03F 3/08* (2006.01)

(52) U.S. Cl. ........ 345/589; 345/590; 345/591; 345/598; 345/599; 345/600; 382/162; 382/163; 382/166; 382/167; 358/1.9; 358/518

(58) Field of Classification Search ........... 345/589–604
See application file for complete search history.

(56) References Cited

U.S. PATENT DOCUMENTS

| | | | |
|---|---|---|---|
| 5,704,026 A | 12/1997 | Wan | |
| 5,832,109 A | 11/1998 | Mahy | |
| 5,872,898 A | 2/1999 | Mahy | |
| 6,480,301 B1 | 11/2002 | Cholewo | |
| 6,698,860 B2 | 3/2004 | Berns et al. | |
| 7,106,474 B1* | 9/2006 | Haikin et al. | 358/1.9 |
| 7,411,701 B2 | 8/2008 | Boll | |
| 2003/0098896 A1 | 5/2003 | Berns et al. | |
| 2005/0254073 A1* | 11/2005 | Braun et al. | 358/1.9 |
| 2006/0119870 A1 | 6/2006 | Ho et al. | |
| 2006/0250623 A1* | 11/2006 | Newman et al. | 358/1.9 |
| 2007/0081176 A1 | 4/2007 | Newman et al. | |
| 2007/0121132 A1 | 5/2007 | Blinn et al. | |
| 2007/0195382 A1 | 8/2007 | Cho et al. | |
| 2008/0117444 A1 | 5/2008 | Stokes | |

OTHER PUBLICATIONS

Derhak, Maxim W. and Rosen, Mitchell R., "Spectral Colorimetry Using Lab/PQR—An Interim Connection Space", Proc. 12th CIC, pp. 246-250 (2004).
Tsutsumi, Shohei, Rosen, Mitchell R. and Berns, Roy S., "Spectral Reproduction using LabPQR: Inverting the Fractional-Area Coverage-to-Spectra Relationship", Proc. ICIS'06, pp. 107-111-(2006).
Bastani, Behnam and Funt, Brian, "Spectral Gamut Mapping and Gamut Concavity", Proc. 15th CIC, pp. 218-221 (2007).
Gonzalez, Sergio "Evaluation of Bispectral Spectrophotometry for Accurate Colorimetry of Printing Materials", RIT, Jun. 2000.
Poynton, C.A. "Wide Gamut Device—Independent Colour Image Interchange", Sun Microsystems Computer Corporation U.S.A., pp. 218-222.
Poynton, C.A. "Wide Gamut Device—Independent Colour Image Interchange", Sun Microsystems Computer Corporation U.S.A., pp. 218-222. (1994).

\* cited by examiner

*Primary Examiner* — Xiao M. Wu
*Assistant Examiner* — Matthew D Salvucci
(74) *Attorney, Agent, or Firm* — Fitzpatrick, Cella, Harper & Scinto

(57) ABSTRACT

Color management using a discrete spectral gamut descriptor. A multi-spectral color image is converted to a spectrally-based ICS representation. In response to a determination that an ICS value is included in a discrete spectral gamut descriptor, the ICS value is converted into a destination-side color. Otherwise, the ICS color value is spectrally gamut mapped, and the gamut-mapped ICS value is converted into a destination-side color. The discrete spectral gamut descriptor includes a collection of discrete cells of a subdivided bounding box that includes a set of sample points in the ICS that span the spectral gamut of the destination device. Each cell has an attribute that represents an initial guess for a destination-side color for ICS values included in the cell, and the attribute is used to convert ICS values included in the cell into destination-side colors.

88 Claims, 18 Drawing Sheets

FAST GAMUT CHECKING AND INVERSION OF SPECTRAL COLORS

FIELD

The present disclosure relates to fast gamut checking and inversion of spectral colors, and more particularly relates to fast gamut checking and inversion of spectral colors in a spectral color management system using a spectral gamut descriptor.

BACKGROUND

In the field of this disclosure, spectral color management systems have been proposed that include multi-spectral image capture devices and multi-ink printers. In such a spectral color management system, a scene is captured by an image capture device (e.g., a multi-spectral digital camera), and a multi-ink printer generates printed output having spectral reflectance properties that are a good match to the spectral reflectance properties of objects included in the captured scene. By matching the spectral reflectance properties of the printed output with the spectral reflectance properties of the captured scene, the spectral color management system can generate printed output whose colors match the colors of original objects in the captured scene under different lighting conditions.

FIG. 1 shows an example workflow of a spectral color management system. A multi-spectral source device (e.g., a multi-spectral digital camera) generates a multi-spectral digital image of a captured scene. The generated image is represented in a device color space specific to the multi-spectral source device (i.e., source device color space 1). A forward source device conversion module 10 for the multi-spectral source device then converts the generated image into a spectral reflectance space 2, by using forward source device model 14. The spectral reflectance representation of the image is generated such that it represents the spectral reflectance of objects in the captured scene.

In particular, the spectral reflectance space 2 is typically determined algorithmically based on measurements of spectral reflectance of stimuli in a reference target and the corresponding response from the multi-spectral source device. Such measurements record the fraction of light reflected at a wavelength in the visual wavelength range that runs approximately from 400 nm to 700 nm. If the measurements of spectral reflectance are taken at every 10 nm in the wavelength range that runs from 400 nm to 700 nm, the spectral reflectance space 2 has a dimension of 31.

The spectral reflectance representation of the generated image is then further converted into an Interim Connection Space (ICS) 3 by an ICS conversion unit 11. The dimension of the ICS is taken to be an integer that is small relative to the dimensionality of spectral space 2, typically from 5 to 8.

A gamut mapping module 12 performs gamut checking to determine whether a spectral ICS value of the generated image is reproducible on an intended destination device, such as, for example, a multi-ink printer. A determination that a spectral ICS value of the generated image is reproducible on the destination device corresponds to an indication that the spectral reflectance of the captured image is reproducible on the destination device. The set of spectra reproducible on the destination device is called the spectral gamut of the destination device, and the data structure used to describe the gamut boundary is called the spectral Gamut Boundary Descriptor (GBD). The GBD contains descriptors for the gamut boundary. The gamut boundary is typically represented by continuous geometric constructs. A popular GBD construct is the convex hull, which is the smallest convex set in the ICS containing a set of sample points that span a gamut.

If the ICS value can be reproduced on the destination device, then the ICS value is passed to an inverse destination device conversion module 13 that converts the ICS data into the device color space 6 specific to the destination device, by using an inverse destination device model 15. If the ICS value cannot be reproduced on the destination device, then gamut mapping is performed using a GBD 4 of the destination device. Gamut-mapped data in the ICS 5 is passed to the inverse destination device conversion module 13 that converts the ICS data into the device color space 6 specific to the destination device.

In a case where the destination device is a multi-ink printer, the destination device uses the color image data in the device color space 6 to generate printed output having the spectral reflectance properties of the captured scene, such that the colors of the printed output match the colors of original objects in the captured scene under different lighting conditions.

SUMMARY

One problem with known spectral color management systems is that computational complexity increases exponentially as the dimension of the ICS increases. Typically, gamut checking and gamut mapping using a convex hull GBD are performed by iterating through a set (or subset) of facets of the convex hull GBD. As the number of facets in the convex hull GBD increases, so does the computational complexity of performing gamut checking and gamut mapping. FIG. 2 illustrates how the number of facets in a convex hull GBD increases exponentially as the dimension of the ICS increases. Thus, in a high-dimension ICS, the computational complexity of performing gamut checking and gamut mapping using a conventional GBD may be high.

Additionally, the computational complexity of converting ICS values into values in the destination device color space increases in a high-dimension ICS. Typically, the conversion of ICS values into destination device values (e.g., by the inverse destination device conversion module 13) involves an iterative search, as illustrated in FIG. 3. As shown in FIG. 3, the inverse destination device conversion module 13 receives an input ICS value $y_0$ and an initial guess $x_0$ for the destination device value at step 30. This initial guess is converted into a spectral reflectance value by a forward destination device conversion module of the destination device at step 31. At step 32, an ICS conversion unit converts the spectral reflectance value corresponding to the initial guess into an ICS value. At step 33, the ICS value of the initial guess is compared to the input ICS value $y_0$. If the difference between the ICS value of the initial guess and the input ICS value $y_0$ is not less than a threshold error tolerance condition, a new guess for the destination device value is generated at step 34, and the conversion process repeats at step 30 with the new guess for the destination device value. However, if the difference between the ICS value of the initial guess and the input ICS value $y_0$ is less than the threshold error tolerance condition, the initial guess or current guess for the destination device value is output at step 35 as the destination device value corresponding to the input ICS value $y_0$. As the ICS dimension increases, so does the computational expense of generating a new guess for the destination device value.

The foregoing situation of exponentially increasing complexity is addressed through the provision of a discrete gamut descriptor that represents the spectral gamut of a destination device as a collection of discrete cells, as opposed to a continuous gamut boundary descriptor that represents the spectral gamut boundary as a collection of facets, and that uses attribute values of cells to convert ICS values to destination device values.

Thus, in an example embodiment described herein, color management is architected so as to convert a source-side color in a source device dependent color space into a counterpart destination-side color in a destination device dependent color space. A multi-spectral color image is accessed, wherein the multi-spectral color image is generated in the source device dependent color space using a multi-spectral source device, the multi-spectral color image is converted into a spectral reflectance representation in a spectral reflectance space, and the spectral reflectance representation is converted into a spectrally-based Interim Connection Space (ICS) representation in a spectrally-based ICS. A determination is made as to whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device. In response to a determination that the spectrally-based ICS value is included in the discrete spectral gamut descriptor, the spectrally-based ICS value is converted into a destination-side color in a destination device dependent color space of the destination device. In response to a determination that the spectrally-based ICS value is not included in the discrete spectral gamut descriptor, the spectrally-based ICS color value is spectrally gamut mapped onto the spectral gamut of the destination device, and the gamut-mapped spectrally-based ICS value is converted into a destination-side color in the destination device dependent color space of the destination device. The discrete spectral gamut descriptor represents the spectral gamut of the destination device as a collection of discrete cells of a subdivided bounding box that includes a set of sample points in the spectrally-based ICS that span the spectral gamut of the destination device. Each cell has an attribute that represents an initial guess for a destination-side color for ICS values included in the cell, and the attribute is used to convert ICS values included in the cell into destination-side colors.

Because gamut checking is performed using a discrete spectral gamut descriptor that represents the spectral gamut of the destination device as a collection of discrete cells of a subdivided bounding box, rather than using a continuous geometric construct, the computational complexity of performing gamut checking may be reduced.

Because the attributes can be used to provide good initial guesses during the process of converting ICS values into destination-side colors, the number of iterations performed before determining a destination-side color that satisfies a threshold error tolerance condition may be reduced. Thus, by reducing the number of iterations in the conversion process, computational complexity of converting ICS values into destination-side colors may be reduced.

In example embodiments, the discrete spectral gamut descriptor is constructed using sample points that span the destination device dependent color space of the destination device. The sample points can be generated and then converted into spectral reflectance values in the spectral reflectance space, and the spectral reflectance values can be converted into spectrally-based ICS values in the spectrally-based ICS. A maximum coordinate value and a minimum coordinate value in each dimension of the spectrally-based ICS can be calculated to define the bounding box that includes the ICS sample points. The bounding box is subdivided into the collection of discrete cells such that there are N intervals in each dimension. A list of cell indices is generated that represents the collection of discrete cells in the discrete spectral gamut descriptor, wherein the list is generated by generating a cell index for each cell including one or more sample points based on the ICS coordinates of the sample points, and the generated cell indices are added to the list of cell indices. The list of cell indices is sorted, and an attribute is associated with each index in the list of cell indices, wherein each attribute provides representative information about sample points included in the cell corresponding to the associated index.

In determining whether the spectrally-based ICS value is included in the discrete spectral gamut descriptor, it is determined whether the spectrally-based ICS value is included in the bounding box of the discrete spectral gamut descriptor, and a determination that the spectrally-based ICS value is not included in the bounding box corresponds to a determination that the spectrally-based ICS value is not included in the discrete spectral gamut descriptor. In response to a determination that the spectrally-based ICS value is included in the bounding box, it is further determined whether the spectrally-based ICS value is included in a cell of the discrete spectral gamut descriptor. A determination that the spectrally-based ICS value is not included in a cell of the discrete spectral gamut descriptor corresponds to a determination that the spectrally-based ICS value is not included in the discrete spectral gamut descriptor.

In determining whether the spectrally-based ICS value is included in a cell of the gamut descriptor, a cell index is calculated for the spectrally-based ICS value based on ICS coordinates of the ICS value, and a search is performed to search for the calculated cell index in the list of sorted cell indices. A search result indicating that the calculated index is included in the list of cell indices corresponds to a determination that the spectrally-based ICS value is included in a cell of the discrete spectral gamut descriptor.

In response to a determination that the spectrally-based ICS value is included in the discrete spectral gamut descriptor, an attribute associated with the calculated index is retrieved, and the spectrally-based ICS value is converted into a destination-side color using the retrieved attribute as an initial guess for the destination-side color.

This brief summary has been provided so that the nature of this disclosure may be understood quickly. A more complete understanding can be obtained by reference to the following detailed description and to the attached drawings.

DETAILED DESCRIPTION

Figure 1:
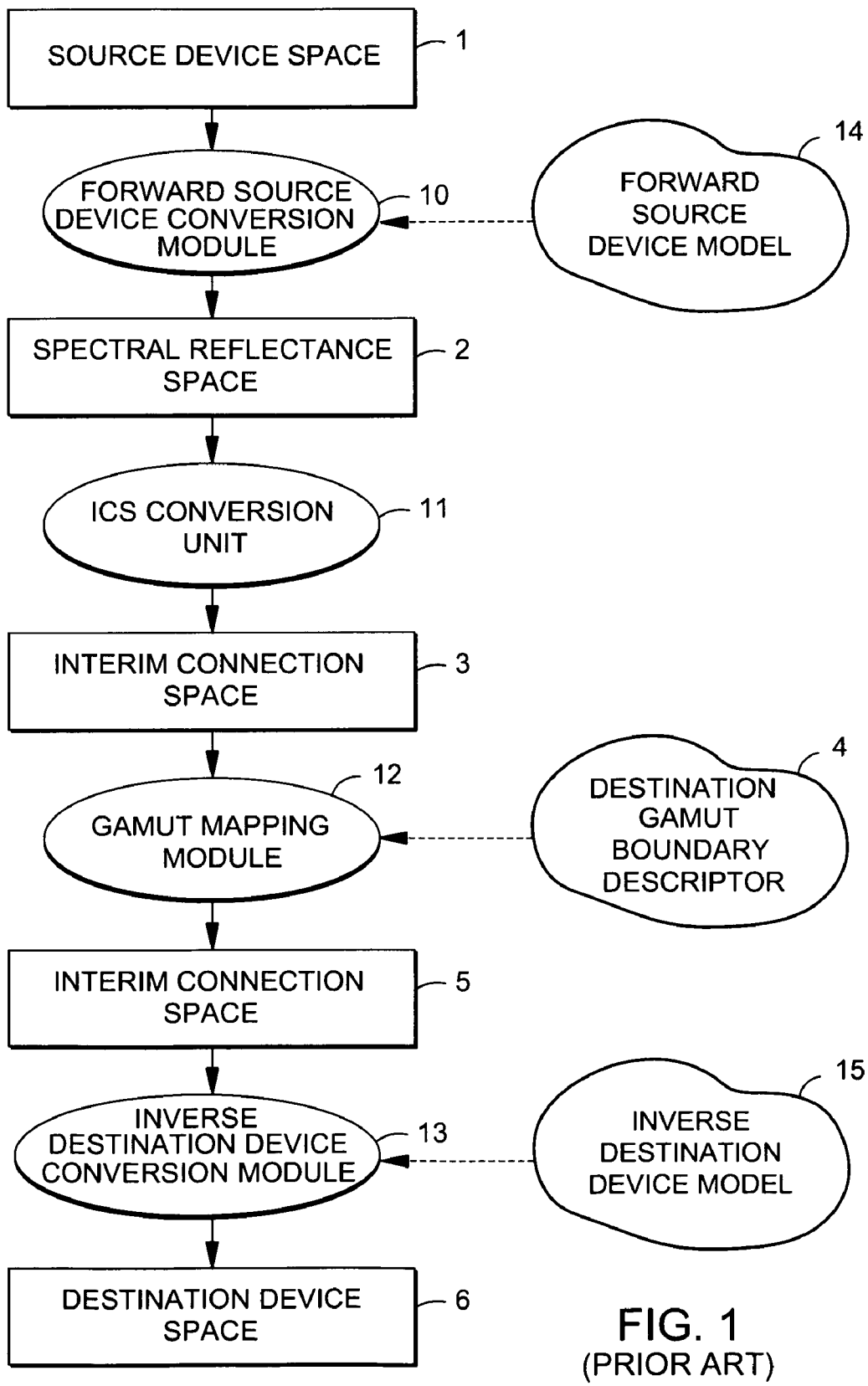
FIG. 1 is a view for explaining the software architecture of a spectral color management system.
Figure 2:
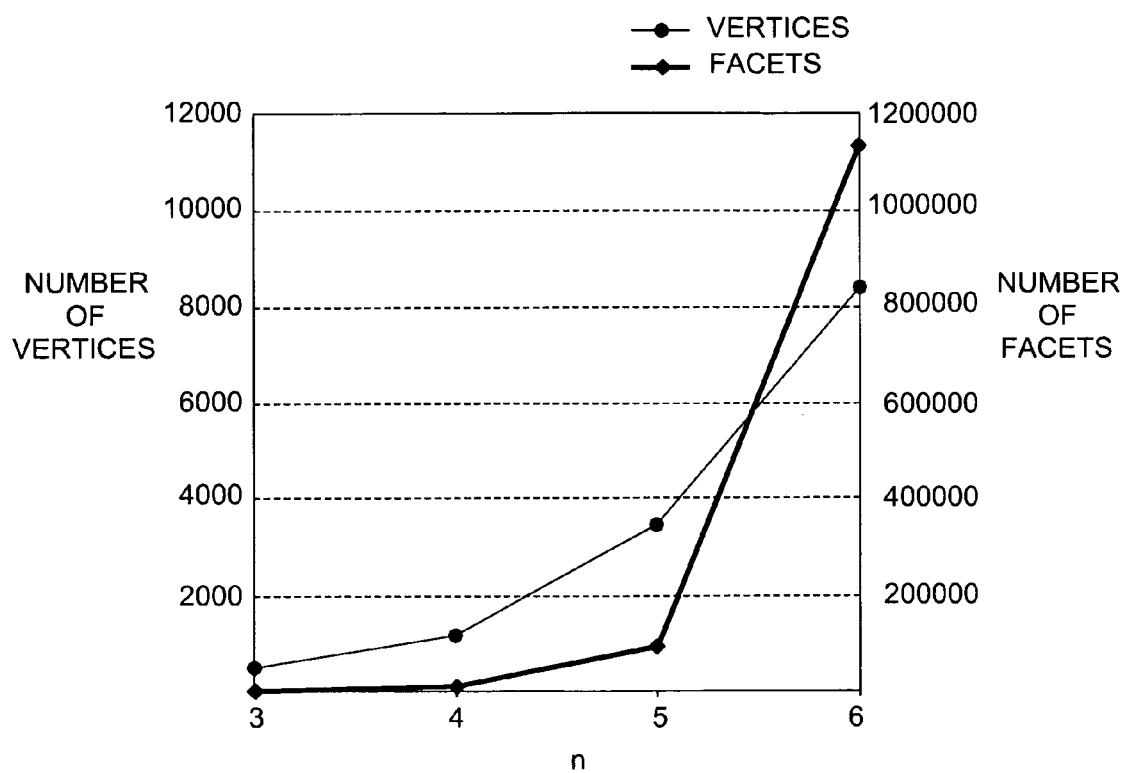
FIG. 2 is a graph that illustrates how the number of vertices and the number of facets in a convex hull GBD increase exponentially as the dimension of the ICS increases.
Figure 3:
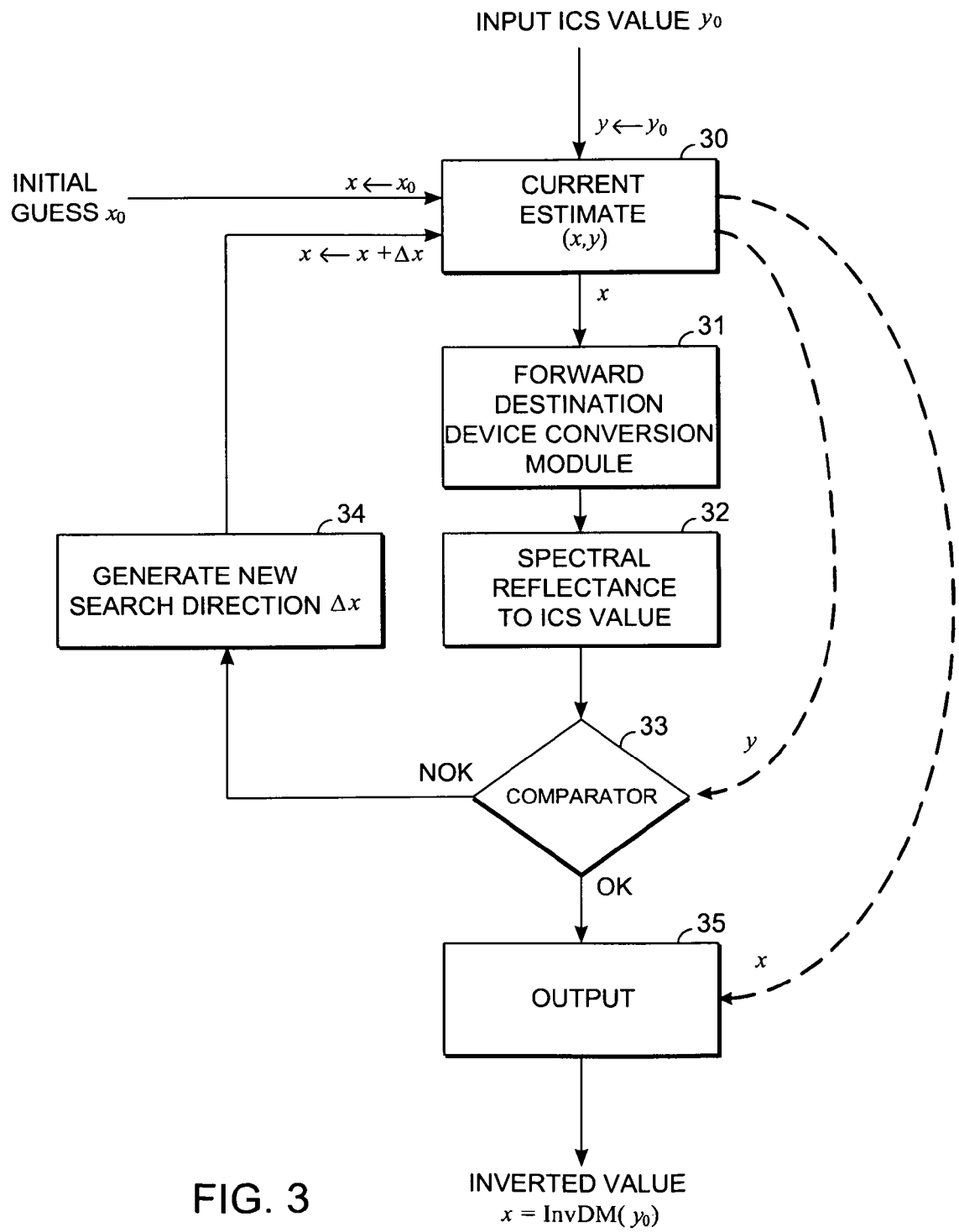
FIG. 3 is a flow diagram for explaining how an inverse destination device conversion module converts ICS values into destination device values.
Figure 4:
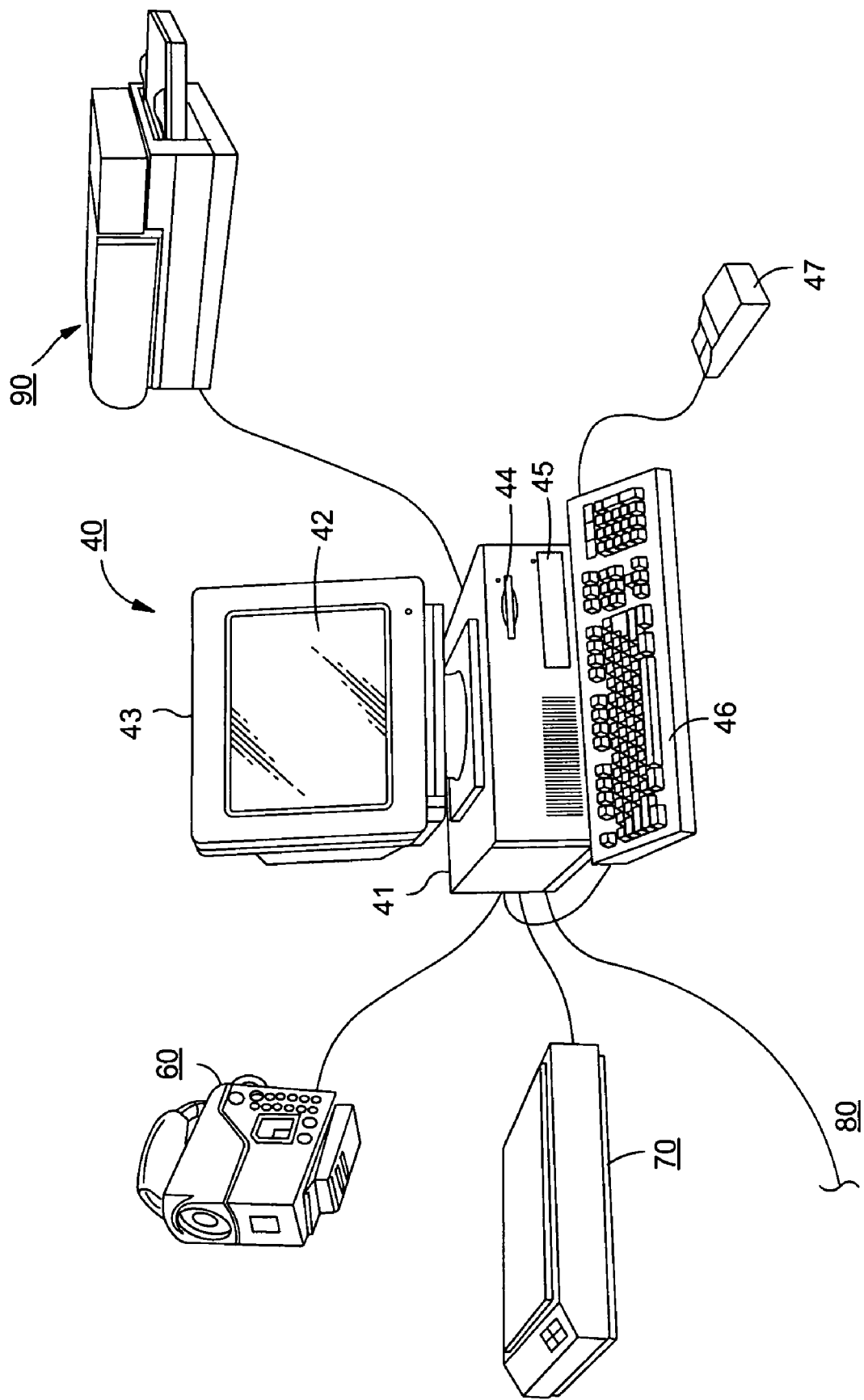
FIG. 4 is a representative view of computing equipment relevant to one example embodiment.

FIG. 4 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Printer 90 is an example of a multi-spectral color output device, and in this example is a multi-ink printer that generates printed output having spectral reflectance properties represented by a spectral image. In particular, printer 90 is a 6-ink CMYKRG color printer which forms color images on a recording medium such as paper or transparencies or the like. Printer 90 forms color images using cyan, magenta, yellow, black, red and green colorants, although printers and other devices can be used which form color images using other colorant combinations that might or might not include black. In addition, printers and other devices having a different number of inks, and capable of generating printed output having spectral reflectance properties represented by a spectral image, can be used.

Multi-spectral digital color scanner 70 is a first example of a multi-spectral color input device, and is provided for scanning documents and images, generating corresponding multi-spectral color image data, and sending the multi-spectral color image data to host computer 41.

Multi-spectral digital color camera 60 is a second example of a multi-spectral color input device, and is provided for capturing objects, generating corresponding multi-spectral color image data, and sending the multi-spectral color image data to host computer 41.

Of course, host computer 41 may acquire digital image data from other sources such as a multi-spectral digital video camera, a local area network or the Internet via network interface 80. Likewise, host computer 41 may interface with other color output devices, such as color output devices accessible over network interface 80, reflective display devices, and electronic paper.

Figure 5:
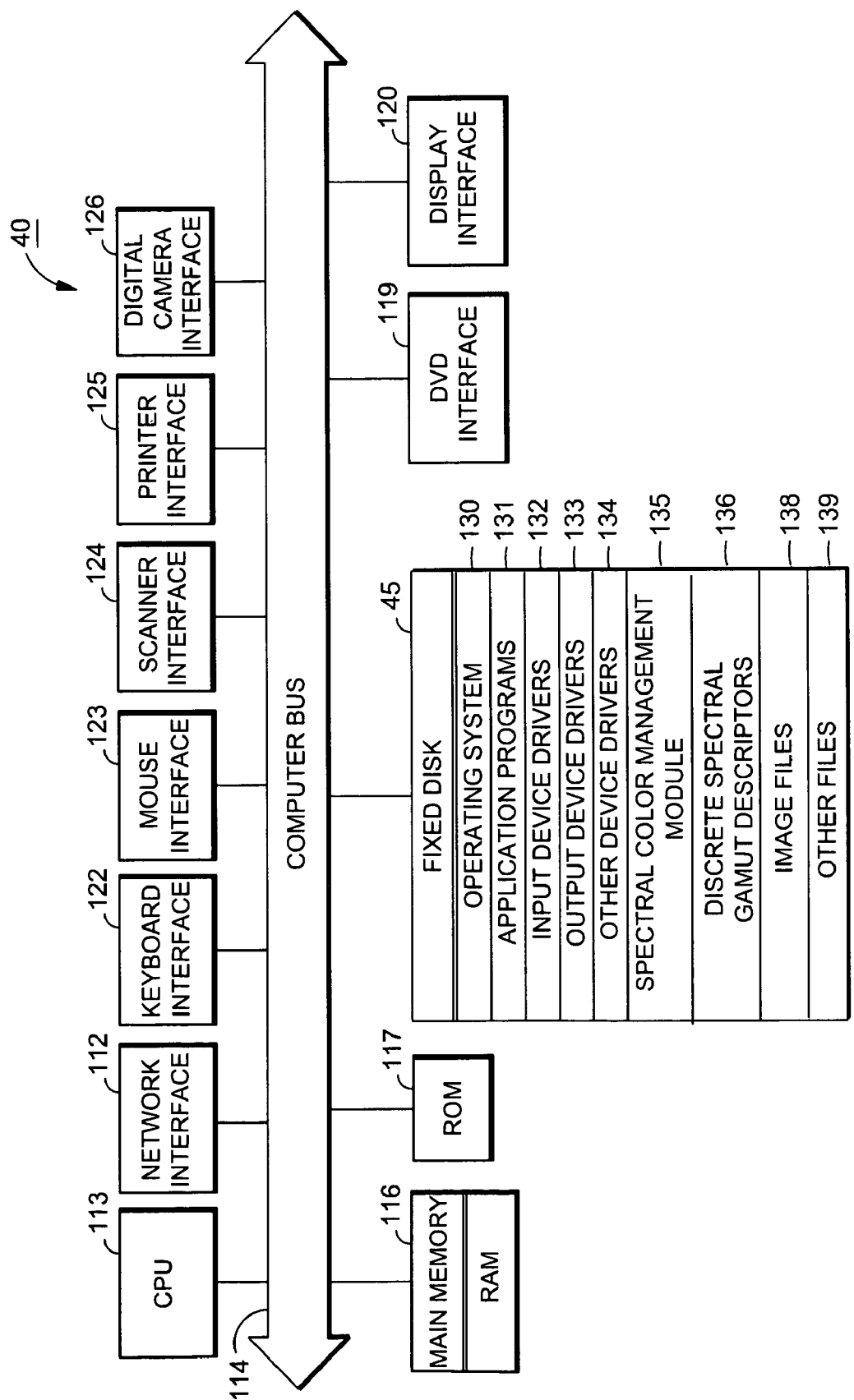
FIG. 5 is a detailed block diagram depicting the internal architecture of the host computer shown in FIG. 4.

FIG. 5 is a detailed block diagram showing the internal architecture of host computer 41 of computing equipment 40. As shown in FIG. 5, host computer 41 includes central processing unit (CPU) 113 which interfaces with computer bus 114. Also interfacing with computer bus 114 are hard disk 45, network interface 112, random access memory (RAM) 116 for use as a main run-time transient memory, read only memory (ROM) 117, DVD disk interface 119, display interface 120 for monitor 43, keyboard interface 122 for keyboard 46, mouse interface 123 for pointing device 47, scanner interface 124 for scanner 70, printer interface 125 for printer 90, and digital camera interface 126 for digital camera 60.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 5, hard disk 45 contains computer-executable process steps for operating system 130, and application programs 131, such as word processing programs or a graphic image management programs. Hard disk 45 also contains computer-executable process steps for device drivers for software interface to devices, such as input device drivers 132, output device drivers 133, and other device drivers 134. Image files 138, including color image files, and other files 139 are available for output to color output devices and for manipulation by application programs.

Spectral color management module (SCMM) 135 comprises computer-executable process steps executed by a computer for managing colors so as to maintain good color fidelity for color images that are transferred from a multi-spectral source device to a destination device, such as the transfer of color image data from capture by multi-spectral digital camera 60 to multi-ink color printer 90. SCMM 135 generally comprises computer-executable process steps that accept a multi-spectral color image generated using a multi-spectral source device (e.g., multi-spectral digital camera 60). The multi-spectral color image has colors with colorant values in a source device dependent color space, and SCMM 135 comprises computer-executable process steps that generate a destination color image having colors with counterpart colorant values in a destination device dependent color space.

More specifically, using device models and color profiles, and/or other color characterizations of the source and destination devices, SCMM 135 converts the multi-spectral color image into a spectral reflectance representation in a spectral reflectance space, and then further converts the spectral reflectance representation into a spectrally-based Interim Connection Space (ICS) representation in a spectrally-based ICS. SCMM 135 determines whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device. In response to a determination that the spectrally-based ICS value is included in the discrete spectral gamut descriptor, SCMM 135 converts the spectrally-based ICS value into a destination-side color in a destination device dependent color space of the destination device. In response to a determination that the spectrally-based ICS value is not included in the discrete spectral gamut descriptor, SCMM 135 performs spectral gamut mapping to map the spectrally-based ICS color value onto the spectral gamut of the destination device, and converts the gamut-mapped spectrally-based ICS value into a destination-side color in the destination device dependent color space of the destination device.

Each discrete spectral gamut descriptor 136 represents the spectral gamut of a destination device as a collection of discrete cells of a subdivided bounding box that includes a set of sample points in the spectrally-based ICS that span the spectral gamut of the destination device. Each cell has an attribute that represents an initial guess for a destination-side color for ICS values included in the cell, and the attribute is used to convert ICS values included in the cell into destination-side colors.

The computer-executable process steps for SCMM 135 may be configured as a part of operating system 130, as part of an output device driver such as a printer driver, or as a stand-alone application program such as a color management system. They may also be configured as a plug-in or dynamic link library (DLL) to the operating system, device driver or application program. For example, SCMM 135 according to example embodiments may be incorporated in an output device driver for execution in a computing device, such as a printer driver, embedded in the firmware of an output device, such as a printer, or provided in a stand-alone color management application for use on a general purpose computer. In one example embodiment described herein, SCMM 135 is incorporated directly into the operating system for general purpose host computer 41. It can be appreciated that the present disclosure is not limited to these embodiments and that the disclosed spectral color management module may be used in other computing environments in which spectral color management is used.

Image files 138 comprise spectral image files. In the example embodiment, the spectral image files contain images captured by a multi-spectral capture device, such as a multi-spectral camera or multi-spectral scanner.

Figure 6:
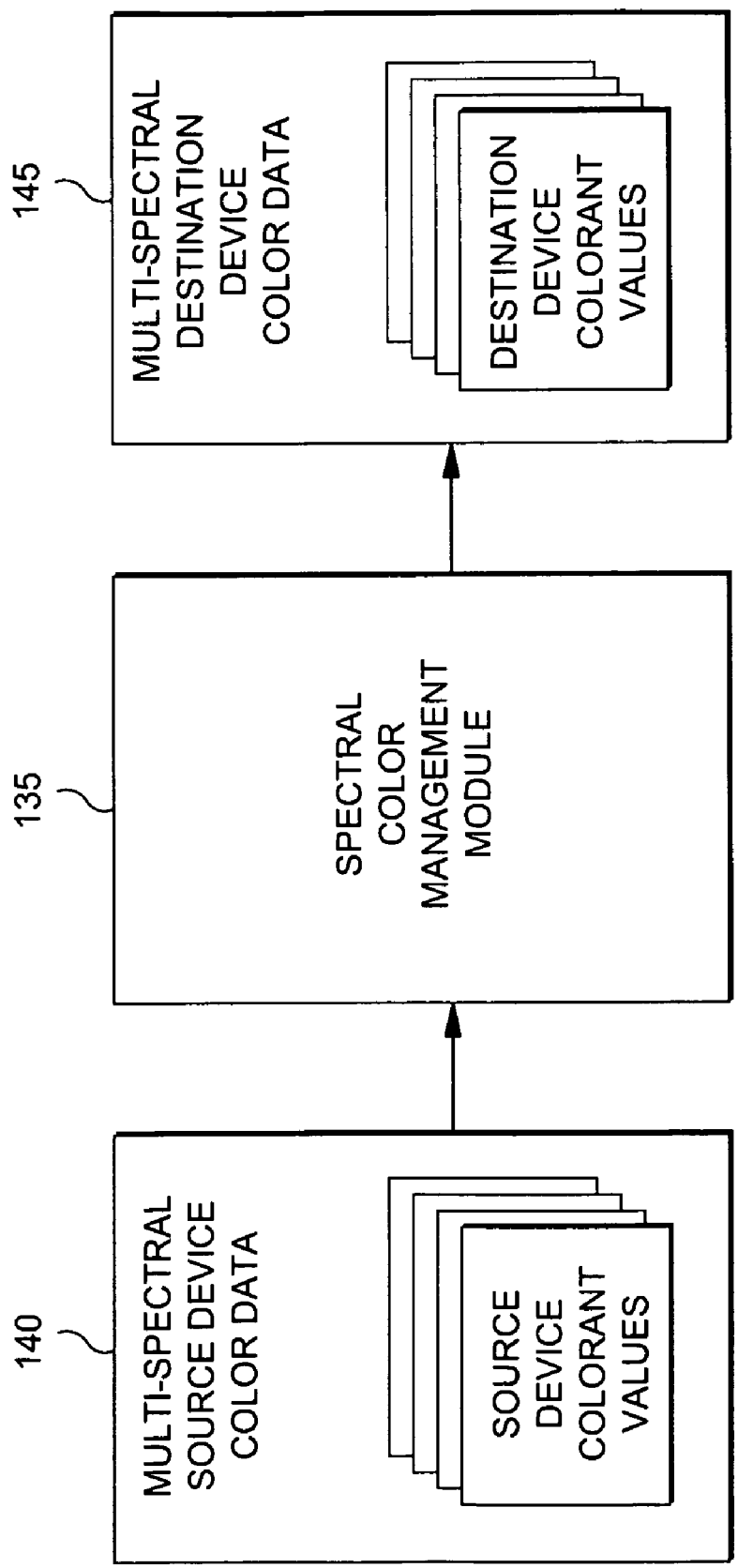
FIG. 6 is a representational view of color transform processing performed by a color management module according to an example embodiment.

FIG. 6 shows a representational view of color transform processing performed by spectral color management. As explained hereinabove, a spectral source color image 140 for a multi-spectral source device contains colorant values in a source device color space. In the example embodiment, the source device color space consists of sensor responses of the multi-spectral capture device.

SCMM 135 is applied to the multi-spectral source device colorant values so as to obtain a counterpart color image 145 for a destination device. Because of the effect of processing by SCMM 135, the destination color image 145 exhibits good color fidelity relative to the source color image 140, despite a change from the multi-spectral source device to the destination device, and despite other changes such as changes in viewing conditions and output media. Color image 145 contains colorant values in the destination device color space, such as CMYKRG colorant values in a CMYKRG color space for a multi-ink color printer.

In use of SCMM 135, nearly any spectral device can serve as the source device, and nearly any spectral device can serve as the destination. In one example, the source device might be multi-spectral digital camera 60 which captures an image of an object, such as an artwork, and the destination device might be multi-ink color printer 90 which produces a printout of the captured object. In another example, the source device might be multi-spectral scanner 70 which scans a document, and the destination device might be multi-ink color printer 90 or multi-primary display 43. Other combinations and permutations are possible and will be evident to those of ordinary skill in the art.

Figure 7:
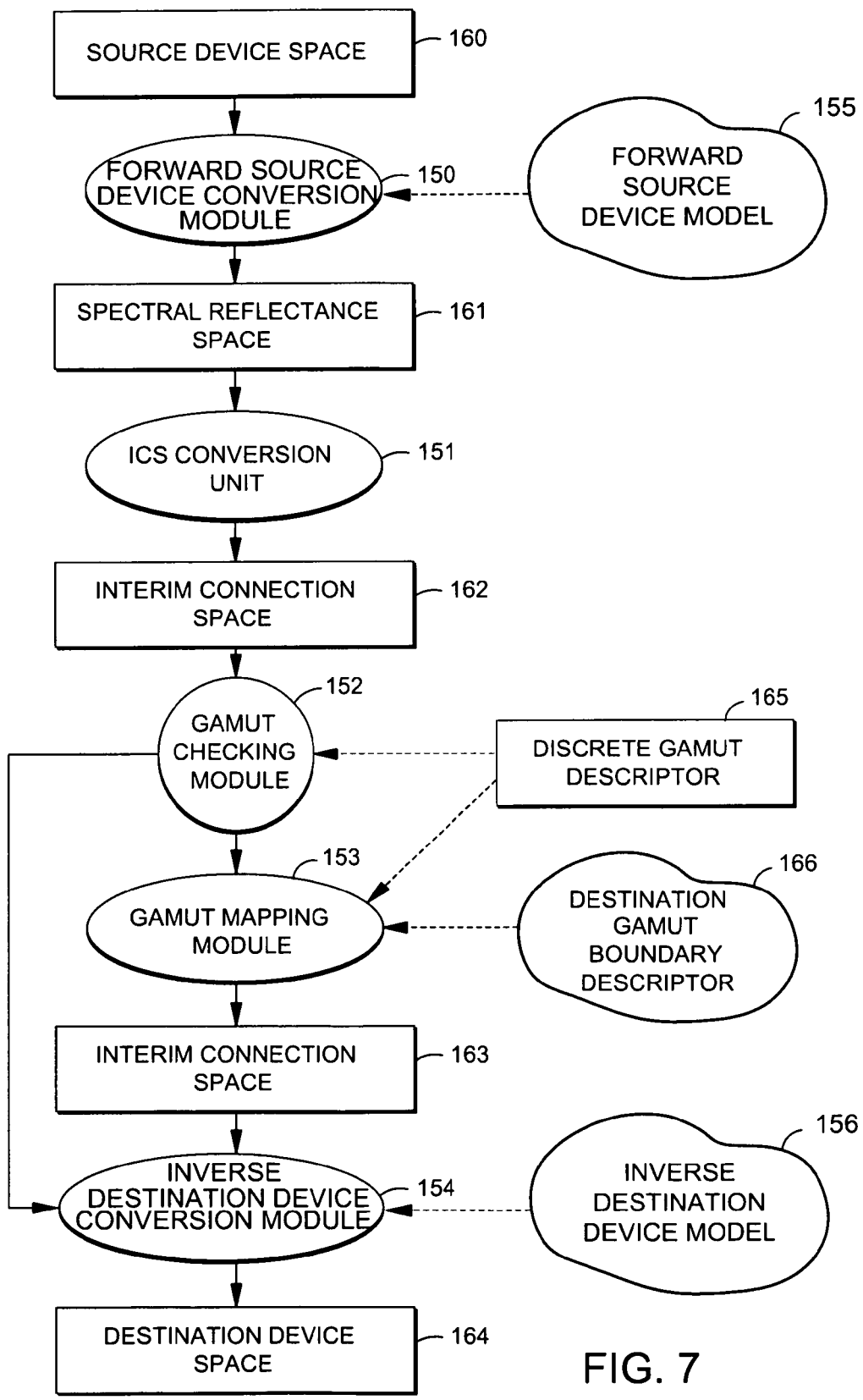
FIG. 7 is a view for explaining the software architecture of a spectral color management module according to an example embodiment

FIG. 7 is a view for explaining the software architecture of spectral color management module 135 according to an example embodiment. As seen in FIG. 7, spectral color management module 135 is architected in multiple modules, and includes forward source device conversion module 150, ICS conversion unit 151, gamut checking module 152, gamut mapping module 153, inverse destination device conversion module 154, and a forward destination device conversion module (not shown).

A multi-spectral digital image of a captured scene, generated by a multi-spectral source device (e.g., multi-spectral digital camera 60), is accessed. The generated image is represented in a device color space specific to the multi-spectral source device (i.e., source device color space 160). The generated image is then received by a forward source device conversion module 150 for the multi-spectral source device.

In the example embodiment, forward source device conversion module 150 uses a forward source device model 155 for a capture device, such as a multi-spectral digital camera, to convert images into spectral reflectance space 161. Forward source device model 155 is built by a statistical method of linear regression on captured data based on a predetermined characterization target, such as the Digital ColorChecker Semi Gloss (SG)®. In the case of a multi-spectral digital camera, a conversion matrix from camera sensor responses to spectral reflectance factors is determined by fitting recorded sensor responses and measured spectral reflectance factors of the color patches on the characterization target. In other embodiments, the forward source device model may be based on any other suitable type of modeling technique.

Forward source device conversion module 150 converts the received multi-spectral image, which is in source device color space 160, into a spectral reflectance space 161. The spectral reflectance representation of the image is generated such that it represents the spectral reflectance of objects in the captured scene.

In particular, the spectral reflectance space 161 is typically specified by a sampling of the visual spectrum, which runs approximately from 400 nm to 700 nm. If the measurements of spectral reflectance are taken at every 10 nm in the wavelength range that runs from 400 nm to 700 nm, the spectral reflectance space 161 has a dimension of 31.

The spectral reflectance representation of the generated image is then passed to an ICS conversion unit 151. ICS conversion unit 151 further converts the received spectral reflectance representation of the generated image into an Interim Connection Space (ICS) 162. The dimension of the ICS is taken to be a relatively small integer, relative to the dimensionality of 161, and typically from 5 to 8. The ICS 162 can be constructed, for example, by applying Principal Component Analysis (PCA) to a set of representative spectral reflectance data, by constructing a LabPQR space, see DERHAK, Maxim W. and ROSEN, Mitchell R., "*Spectral Colorimetry Using LabPQR—An Interim Connection Space*", Proceedings of the $12^{th}$ Color Imaging Conference, pp. 246-250 (2004), the entire contents of which are incorporated by reference as if set forth in full herein, or by performing any other suitable ICS construction process.

The spectrally-based ICS representation of the generated image is passed to gamut checking module 152. For each spectrally-based ICS value of the received spectrally-based ICS representation, gamut checking module 152 determines whether the spectrally-based ICS value is within a spectral gamut of an intended destination device (e.g., multi-ink color printer 90). Gamut checking module 152 makes this determination by determining whether the spectrally-based ICS value is included in discrete spectral gamut descriptor 165, which represents the spectral gamut of the destination device. Discrete spectral gamut descriptor 165 represents the spectral gamut of the destination device (e.g., multi-ink color printer 90) as a collection of discrete cells of a subdivided bounding box that includes a set of sample points in the spectrally-based ICS that span the spectral gamut of the destination device. Each cell has an attribute that represents an initial guess for a destination-side color for ICS values included in the cell, and the attribute is used to convert ICS values included in the cell into destination-side colors.

If gamut checking module 152 determines that a spectrally-based ICS value is included in discrete spectral gamut descriptor 165, then the spectrally-based ICS value is passed to inverse destination device conversion module 154. Inverse destination device conversion module 154 converts the received spectrally-based ICS value into a destination-side color in destination device dependent color space 164, which is the color space of the destination device (e.g., multi-ink color printer 90). Inverse destination device conversion module 154 performs the conversion by using an inverse destination device model 156.

If gamut checking module 152 determines that a spectrally-based ICS value is not included in discrete spectral gamut descriptor 165, then gamut mapping module 153 performs spectral gamut mapping to map the spectrally-based ICS color value onto the spectral gamut 163 of the destination device. Gamut mapping module 153 performs gamut mapping using discrete gamut descriptor 165 and continuous spectral gamut boundary descriptor 166. Continuous spectral gamut boundary descriptor 166 is a data structure used to describe the boundary of the spectral gamut of the destination device (e.g., multi-ink color printer 90). The spectral gamut of the destination device is the set of spectra reproducible on the destination device. Continuous spectral gamut boundary descriptor 166 contains descriptors for the gamut boundary, and is represented by a continuous geometric construct, such as, for example, a convex hull, but in other embodiments, continuous spectral gamut boundary descriptor 166 can be represented by other types of continuous geometric constructs.

After gamut mapping module 153 gamut maps a spectrally-based ICS value, the gamut-mapped spectrally-based ICS value is passed to inverse destination device conversion module 154. Inverse destination device conversion module 154 converts the received gamut-mapped spectrally-based ICS value into a destination-side color in destination device dependent color space 164, which is the color space of the destination device (e.g., multi-ink color printer 90). Inverse destination device conversion module 154 performs the conversion by using an inverse destination device model 156.

Figure 8:
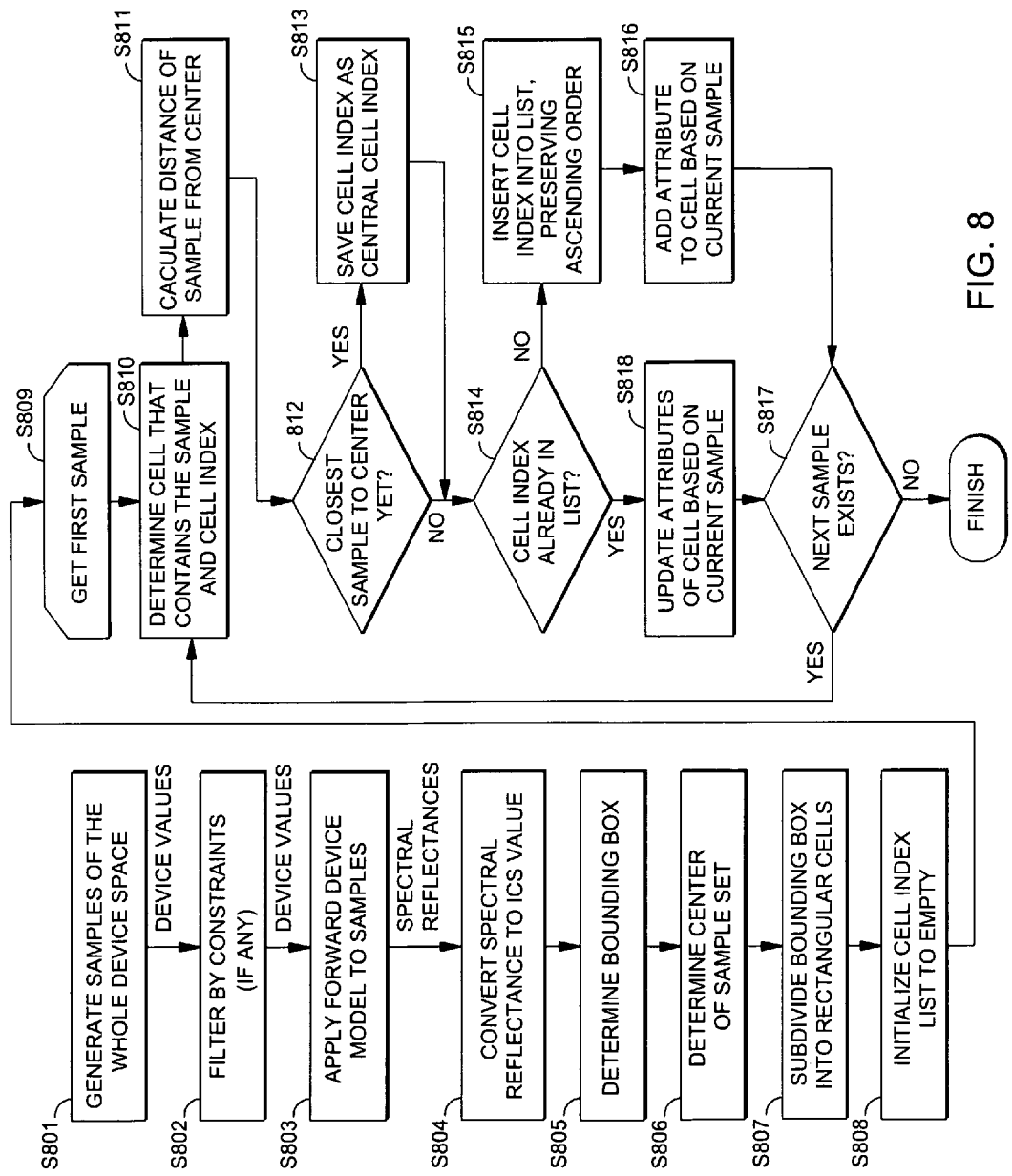
FIG. 8 is a flow diagram for explaining construction of a discrete spectral gamut descriptor, according to an example embodiment.

FIG. 8 is a flow diagram for explaining construction of discrete spectral gamut descriptor 165 according to an example embodiment. The process steps shown in FIG. 8 are computer-executable process steps stored on a computer-readable memory medium such as at 135 on disk 45, and are executed by CPU 113 of host computer 41, so as to construct discrete spectral gamut descriptor 165. In the example embodiment, the destination device is a multi-ink printer, e.g., multi-ink color printer 90, but in other embodiments, the destination device can be, for example, a reflective display device or a display device with electronic inks.

In other embodiments, the discrete spectral gamut descriptor is pre-computed and stored for an end-user in a different machine, such as a machine of a manufacturer of an output device (e.g., multi-ink color printer 90). In this case, the process steps shown in FIG. 8 are executed by a CPU of the output device manufacturer's computer, and the discrete spectral gamut descriptor is stored on a computer-readable medium. An end-user obtains the discrete spectral gamut descriptor from the computer-readable medium as file 136, for use by host computer 41.

Briefly, according to the process steps shown in FIG. 8, sample points are generated that span the destination device dependent color space of the destination device. Each of the generated sample points is converted into spectral reflectance values in a spectral reflectance space. The spectral reflectance values are converted into spectrally-based ICS values in a spectrally-based ICS. A maximum coordinate value and a minimum coordinate value in each dimension of the spectrally-based ICS are calculated to define a bounding box that includes the ICS sample points. The bounding box is subdivided into a collection of discrete cells such that there are N intervals in each dimension. A list of cell indices that represents the collection of discrete cells in the discrete spectral gamut descriptor is generated, wherein the list is generated by generating a cell index for cells including one or more sample points based on the ICS coordinates of the sample points, and adding the generated cell indices to the list of cell indices. The list of cell indices is sorted, and an attribute is associated with each index in the list of cell indices. Each attribute provides representative information about sample points included in the cell corresponding to the associated index.

In more detail, in step S801 spectral color management module (SCMM) 135 generates sample points that span destination device dependent color space of the destination device. Sampling steps are generated for each ink. The number of sampling steps, s, generated for each ink is sufficiently large in order to span the gamut of the destination device sufficiently. In other embodiments, rather than generate the sampling steps for a multi-ink color printer such that they are uniformly distributed in the ink amount, the number of generated sampling steps can be uniformly distributed in another color space, such as, for example, CIELAB space or density space. In other embodiments, rather than generate the same number of sampling steps for each ink in a multi-ink color printer, the number of sampling steps can be different for each ink.

For example, in the case of a 6-ink color printer wherein the same number s of sampling steps are generated for each ink, if the number of sampling steps s is 20, a total of $s^6$=64,000,000 ink samples are generated.

In the example embodiment, the sample points are generated by performing a uniform sampling of the destination device dependent color space. In other words, if the number of channels is c, and the number of steps is s, then the sampling grid is formed by the Cartesian product of uniform sampling steps in each channel, giving a total of $s^c$ sample points.

In another example embodiment, the sample points are generated by performing a uniform sampling in each channel, but with a different number of steps in each channel. With $s_i$ number of steps in the ith channel, the total number of sampling points is $s_1 s_2 \ldots s_c$. This may be useful for example in reducing sampling steps on the black ink channel. In another example embodiment, each channel is linearized, and the sample points are generated by performing a uniform sampling in each linearized channel of the destination device dependent color space. In another example embodiment, each channel is linearized, and the sample points are generated by performing a uniform sampling in each linearized channel, but with a different number of steps in each channel.

In step S802 SCMM 135 filters the generated sample points for overinking based on constraints, if any constraints are specified. For example, a constraint can limit the ink amount for filtered sample points. Typical ink limits are from 200% to 250%. Sample points having ink amounts that exceed the ink limits are not used.

In step S803, SCMM 135 passes the filtered sample points in the device dependent color space to the forward device conversion module of the destination device. The forward device conversion module of the destination device converts the received sample points in the device dependent color space into spectral reflectance values in the spectral reflectance space, by using a forward destination device model. In more detail, because of the large number of filtered sample points that are typically generated, it may be difficult to print and measure all the samples spectrally. Therefore, the spectral reflectance values are determined algorithmically using the forward destination device model, without actually printing the samples. In this sense, the generated samples are "virtual samples", since they are not actually printed out, and spectral reflectance values are not actually measured. The forward destination device model is typically built on a coarse sampling of the destination device color space, such as a 5-step sampling in each ink, and is based at least partly on a physical modeling, such as the Cellular Yule-Nielsen modified Spectral Neugebauer (CYNSN) model, but in other embodiments, the forward destination device model may be based on any other suitable type of modeling. Samples used to build the forward destination device model are obtained by measuring color patches spectrally. As is the case with the CYNSN model, the forward destination device model can include a LUT (Look Up Table) at least in part.

In step S804, SCMM 135 passes the spectral reflectance values in the spectral reflectance space to ICS conversion unit 151. ICS conversion unit 151 converts the received spectral reflectance values into spectrally-based ICS values in the spectrally-based ICS, thus generating ICS sample points. In the example embodiment, the ICS sample points are stored on a computer-readable memory medium such as in RAM 116.

In step S805, SCMM 135 calculates a maximum coordinate value and a minimum coordinate value in each dimension of the spectrally-based ICS to define a bounding box that includes the ICS sample points. For example, if the dimension of the ICS is 6, then the bounding box is defined as shown in Equation 1:

$$[m_1, M_1] \times [m_2, M_2] \times [m_3, M_3] \times [m_4, M_4] \times [m_5, M_5] \times [m_6, M_6] \quad \text{(Equation 1)}$$

As shown in Equation 1, for each dimension i, $m_i$ is the minimum coordinate value in dimension i, and $M_i$ is the maximum coordinate value in dimension i. The coordinates that define the bounding box are stored on a computer-readable memory medium such as in RAM 116, so that they may be retrieved by gamut checking module 152, as will be described below with respect to FIG. 12.

In step S806, SCMM 135 determines the "center" of the sample set. The center of the sample set will be used to identify a special cell called the "Central Cell", which will be described below with respect to FIG. 13. In the example embodiment, the "center" of a sample set is defined to be the average of the "extremal points" of the sample set. An extremal point is a sample point with at least one of the coordinates being either the maximum or the minimum coordinate value in that dimension. There can be at most $2^n$ extremal points, where n is the dimension of the ICS. If E is the set of extremal points, then the center of the sample set is defined as shown in Equation 2, where |E| denotes the number of extremal points in the set E:

$$\sum_{p \in E} p / |E| \quad \text{(Equation 2)}$$

In step S807, SCMM 135 subdivides the bounding box into a collection of discrete cells, such that there are N intervals in each dimension. In the example embodiment described herein, the coordinates of the ICS are pre-scaled so that the Just Noticeable Distance (JND) for the human visual system corresponds to 1 unit distance in the ICS, and N is chosen such that sample points are not too far away from each other. More specifically, N is chosen such that the linear dimension of each cell is less than or equal to a threshold factor T, which is a multiple of the JND, as shown in Equation 3:

$$\max_{i=1,2,\ldots,n} \frac{M_i - m_i}{T} \leq N \quad \text{(Equation 3)}$$

As shown in Equation 3, n is the dimension of the ICS. For example, if T=5, then N is chosen such that the linear dimension of each cell is less than or equal to 5, which is 5 times JND, since the coordinates of the ICS are pre-scaled so that JND is 1 unit distance.

In step S808, SCMM 135 initializes the cell index list to be an empty list, and in step S809, SCMM 135 retrieves a first ICS sample point from RAM 116. In step S810, SCMM 135 determines the cell that contains the retrieved ICS sample point, and then generates a 1-dimensional cell index for the determined cell. The cell that contains the retrieved ICS sample point is determined using the ICS coordinates of the ICS sample point. For an ICS sample point having coordinates $x_1, x_2, \ldots, x_n$ in an n-dimensional ICS, the zero-based indices that define the cell in the bounding box that contains the ICS sample point are defined by the n-tuple $(I_1, I_2, \ldots, I_n)$, wherein for i=1 to n, $I_i$ is defined as shown in Equation 4:

$$I_i = \left\lfloor \frac{x_i - m_i}{M_i - m_i} \cdot N \right\rfloor \quad \text{(Equation 4)}$$

As shown in Equation 4, for each dimension i, $m_i$ is the minimum coordinate value in dimension i, $M_i$ is the maximum coordinate value in dimension i as per the definition of the bounding box, and N is the value chosen in step S807. If $I_i$ is equal to N, then $I_i$ is set to N−1 instead. For the determined cell defined by the n-tuple $(I_1, I_2, \ldots, I_n)$, the 1-dimensional cell index J is defined as shown in Equation 5:

$$J = I_1 \cdot N^{n-1} + I_2 \cdot N^{n-2} + \ldots + I_{n-1} \cdot N + I_n \quad \text{(Equation 5)}$$

Since the range of the index J is 0 to $N^n-1$, for n=6 for example, N can be at most 40 if a 32-bit integer is used to store the index. For larger n and N, a 64-bit integer is used to store the index.

In step S811, SCMM 135 calculates the distance from the current sample point to the center of the sample set as determined in step S806. In step S812, SCMM 135 makes a determination as to whether the distance calculated is the smallest distance seen yet (which is automatically the case if the current sample point is the first sample point). If the determination is "no", the processing proceeds to step S814. If the determination is "yes", then the processing proceeds to step S813. In step S813, SCMM 135 saves the current cell index as the index of the central cell, and the processing proceeds to step S814.

In step S814, SCMM 135 determines whether the index J is already in the cell index list. In the example embodiment, SCMM 135 determines whether the index J is already in the cell index list by performing a binary search.

If SCMM 135 determines that the index J is not already in the cell index list ("NO" at step S814), then in step S815, the index J is recorded into the cell index list to indicate that the corresponding cell is occupied. In the example embodiment, the index J is recorded into the cell index list by inserting it in a position in the list so as to preserve an ascending sort order of the list. In other example embodiments, the index J is recorded into the cell index list by inserting it in a position in the list so as to preserve a descending sort order of the list. After the index J is recorded into the cell index list, processing proceeds to step S816.

In step S816, SCMM 135 associates an attribute with the index J. The attribute provides representative information about the ICS sample points included in the cell corresponding to the index J. In the example embodiment, each attribute is a device value, such as a CMYKRG ink combination for a CMYKRG printer, for a representative ICS sample point lying inside the corresponding cell. The device value is used as an initial guess for the inverse destination device conversion module. In other embodiments, the attributes can include other types of information, such as, for example, statistics of the ICS sample points within the cell. After SCMM 135 associates an attribute with the index J, processing proceeds to step S817.

If SCMM 135 determines that the index J is already in the cell index list ("YES" at step S814) (for example, when a previously processed sample point is contained in the current cell), then processing proceeds to step S818. In step S818, SCMM 135 updates the original attribute associated with the index J if the attribute associated with the current ICS sample point is better than original attribute, based on specified criteria. In the example embodiment, each attribute is a device value for a representative ICS sample point lying inside the corresponding cell. The representative ICS sample point corresponding to the original attribute is determined, and if the current ICS sample point is closer to the center of the cell than the representative ICS sample point, then the device value for the current ICS sample point is set as the new attribute for the cell. In the example embodiment, the representative ICS sample point of a cell at any time is determined by an index into the set of sample points, wherein the index dereferences to both the device value and the ICS value of the corresponding sample.

In another example embodiment, if the device value for the current ICS sample point has a lower value in the black channel than the black channel of the device value (i.e., attribute) currently associated with the cell, then the attribute of the cell is updated to be the device value of the current ICS sample point.

In another example embodiment, if the device value for the current ICS sample point has a higher value in the black channel than the black channel of the device value (i.e., attribute) currently associated with the cell, then the attribute of the cell is updated to be the device value of the current ICS sample point.

In another example embodiment, if the device value for the current ICS sample point has a higher purity than the device value (i.e., attribute) currently associated with the cell, in the sense that the device value for the current ICS sample has a greater number of zero channels, then the attribute of the cell is updated to be the device value of the current ICS sample point.

In other example embodiments, combinations of the above-described updating strategies (i.e., closest to the center of the cell, lowest black channel, highest black channel, highest purity) for updating the attribute of a cell can be used, wherein a priority is assigned to each strategy. For example, strategies can be prioritized as follows: 1) most pure, 2) lowest black channel, 3) closest to the center of the cell. If the device values for both ICS sample points are equally pure, then the device value having the lowest black channel is selected as the attribute. If both device values have the same black channel, then the device value corresponding to the ICS sample point closest to the center of the cell is selected as the attribute.

After SCMM 135 updates the attribute associated with the index J, processing proceeds to step S817.

In step S817, SCMM 135 determines whether a next ICS sample point exists. If SCMM 135 determines that a next ICS sample point exists ("YES" at step S817), then SCMM 135 retrieves the next ICS sample point from RAM 116, and processing returns to step S810 where SCMM 135 determines the cell that contains the next ICS sample point, and then generates a 1-dimensional cell index for the determined cell.

If SCMM 135 determines that a next ICS sample point does not exist ("NO" at step 813), then construction of discrete spectral gamut descriptor 165 is complete, and SCMM 135 stores the cell index list on a computer-readable memory medium such as at 136 on disk 45.

Figure 9:
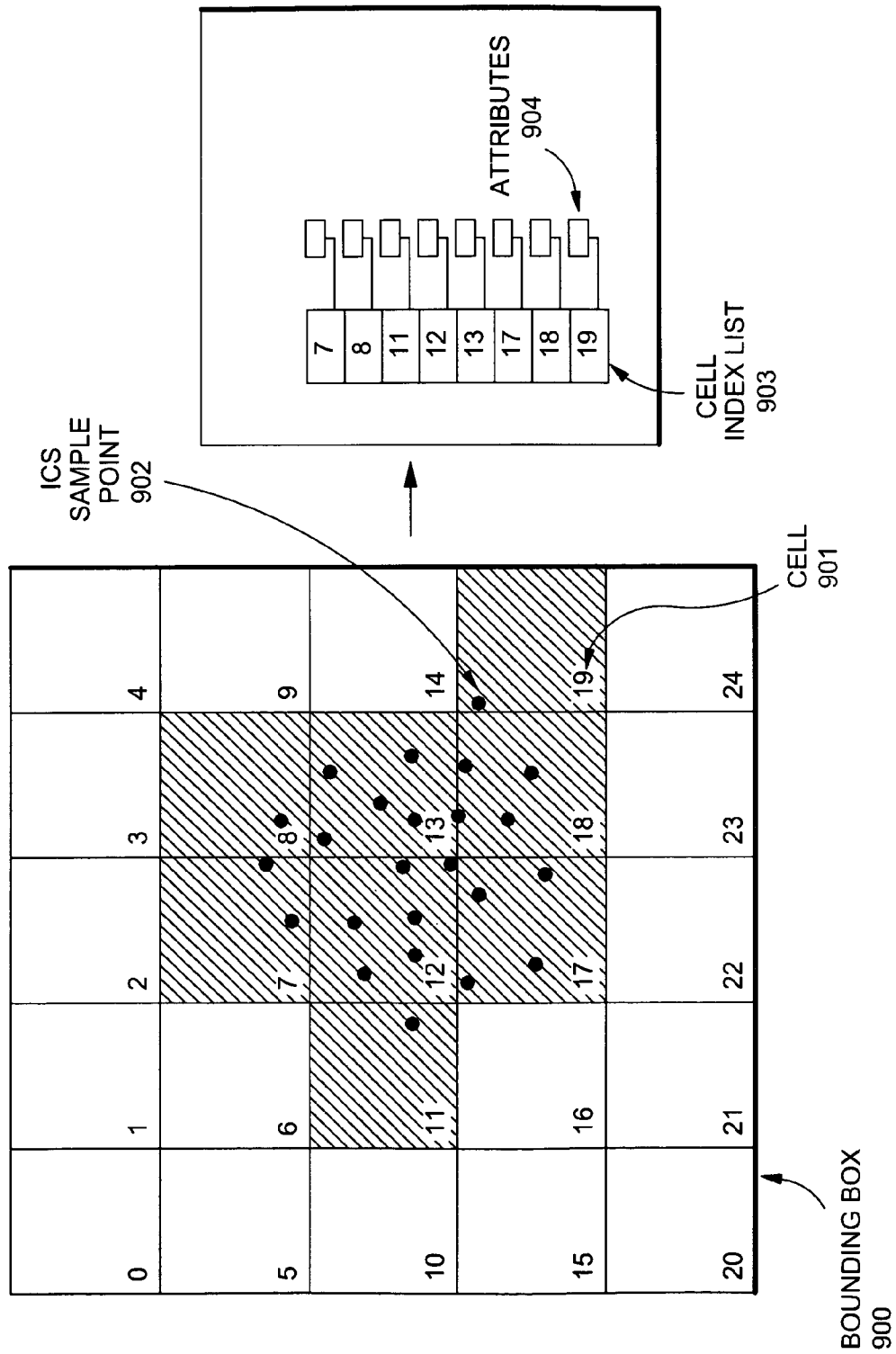
FIG. 9 is a conceptual illustration of a discrete spectral gamut descriptor, according to an example embodiment.

FIG. 9 is a conceptual illustration of an example discrete spectral gamut descriptor. As shown in FIG. 9, bounding box 900 is subdivided into 5 cells in each dimension (i.e., N=5). Since cell 901 includes a sample point 902, the index of cell 901 (i.e., 19) is included in cell index list 903, along with attributes 904.

In another embodiment, when the bounding box is divided into a collection of discrete cells by a process step similar to step S807, the number of subdivision intervals N is chosen such that, in addition to satisfying Equation 3 above, the number of cells in the discrete spectral gamut descriptor is less than an upper bound K. Specifically, the volume $V_0$ of the continuous spectral gamut of the destination device (as described by the continuous spectral gamut boundary descriptor) is estimated. The continuous spectral gamut boundary descriptor may be the convex hull of the whole set of ICS sample points. Alternatively, if the whole set of ICS sample points is not available (for example, in an embodiment in which each ICS sample point is generated and processed on the fly, as will be described below with respect to FIG. 11) a "crude" convex hull can be obtained by generating ICS sample points from a more sparse sampling (i.e., a coarse sampling) of the device space of the destination device, and the "crude" convex hull can be used to estimate the volume $V_0$. Since the convex hull may not represent the true gamut (due to local concavity, for example), an estimate of the order of magnitude of the volume of the spectral gamut of the destination device may be sufficient. The volume of each cell is $$\prod_{i=1}^{n} \frac{M_i - m_i}{N}.$$

If a bound K is to be imposed on the number of cells in the discrete spectral gamut descriptor, then N is chosen such that, in addition to satisfying Equation 3 above, N satisfies Equation 6:

$$N \leq \left(K \cdot \prod_{i=1}^{n} (M_i - m_i)/V_0\right)^{1/n} \quad \text{(Equation 6)}$$

For example, if 500 MB (i.e., 524,288,000 bytes) of memory is budgeted for storing the list of cell indices that represents the collection of discrete cells in the discrete spectral gamut descriptor, and a 64-bit (i.e., 8 byte) integer is used to store the index for each cell, without taking into account the storage needed for the attributes of the cells, K=524,288,000 bytes of memory/8 bytes per cell index=65,536,000 cell indices. Thus, N is chosen by way of Equation 6 so that the number of cells in the discrete spectral gamut descriptor is less than or equal to 65,536,000 if 500 MB of memory is budgeted for storing the list of cell indices, not taking into account the storage needed for the attributes of the cells.

In another embodiment, when the bounding box is divided into a collection of discrete cells by a process step similar to step S807, the number of subdivision intervals N is further chosen in an optimal fashion. Namely, while increasing the subdivision of the bounding box tends to improve the accuracy of the discrete gamut descriptor as an approximation to the continuous gamut, there is a hidden fallacy that the subdivision may be so fine that the resulting discrete gamut descriptor consists of very small cells that contain very few sample points. In other words, if the subdivision is overly fine, there is a danger that the resulting discrete gamut descriptor approximates the sample point distribution, instead of the gamut volume that the sample points span. To overcome this difficulty, the value of N may be lowered to decrease the subdivision of the bounding box such that the volume of the discrete gamut approximates, or is at least at the same order of magnitude as the volume of the continuous gamut.

Figure 10A:
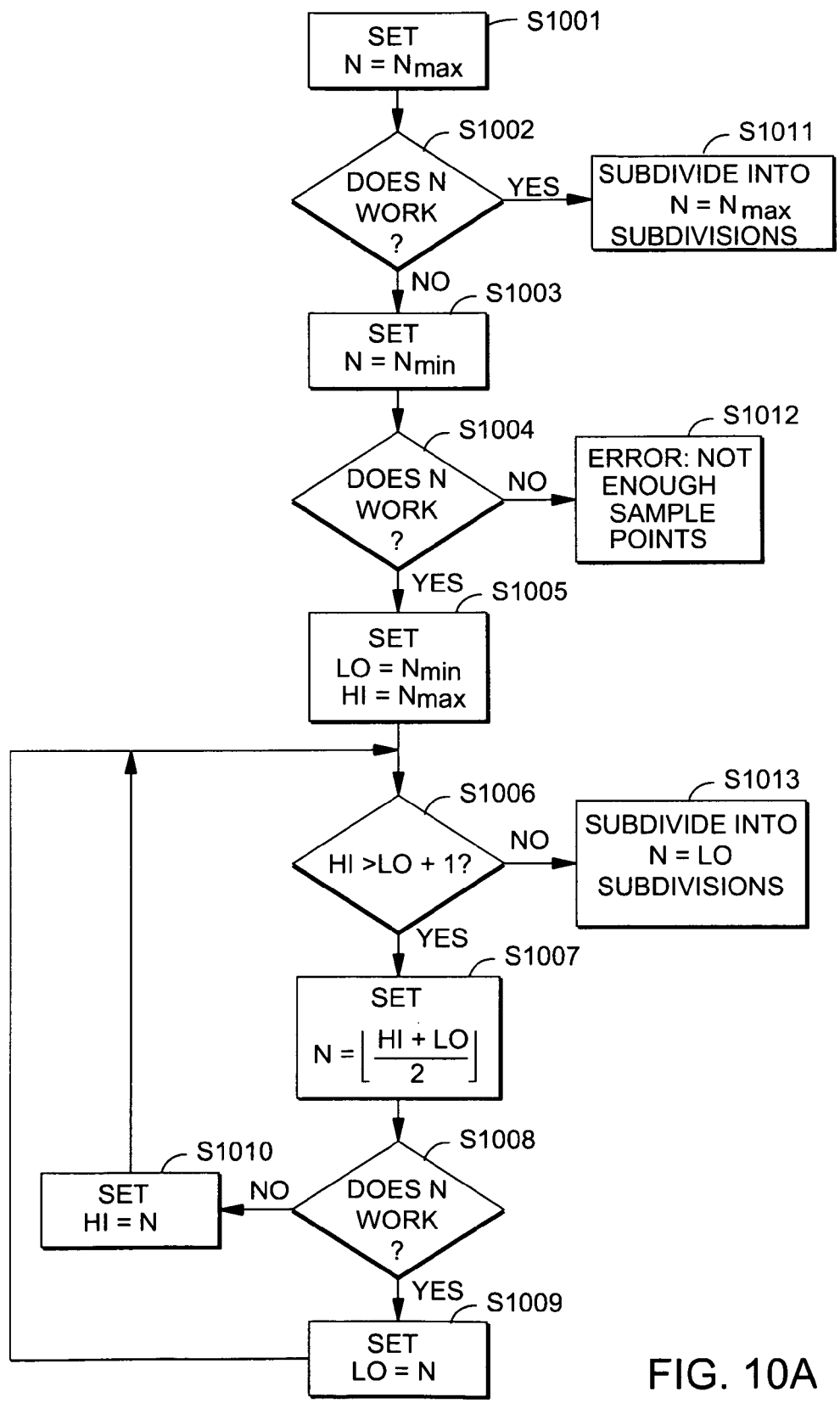
FIGS. 10A and 10B are flow diagrams for explaining a process for optimizing the subdivision of the bounding box of the discrete spectral gamut, according to an example embodiment.
Figure 10B:
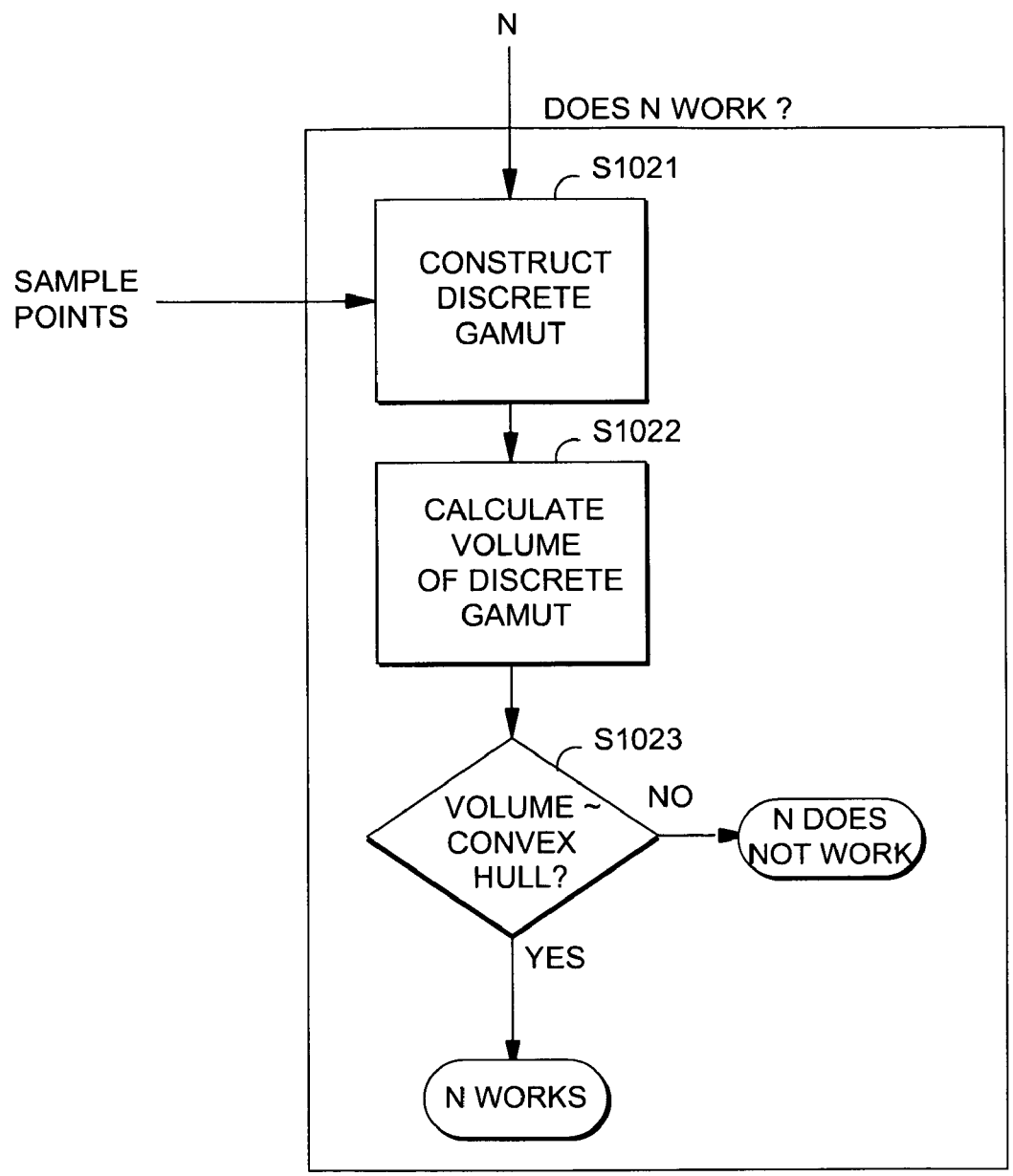

FIGS. 10A and 10B are flow diagrams for explaining a process for choosing N in an optimal fashion as described above. The process steps shown in FIGS. 10A and 10B are computer-executable process steps stored on a computer-readable memory medium, and are executed by a CPU of host computer, so as to optimize the discrete spectral gamut descriptor.

According to the process steps shown in FIG. 10A, in step S1001, an initial value of N is chosen such that N is the maximum value (i.e., $N_{max}$) that satisfies Equation 6 above, or more precisely:

$$N_{max} = \left\lfloor \left(K \cdot \prod_{i=1}^{n} (M_i - m_i)/V_0\right)^{1/n} \right\rfloor \quad \text{(Equation 7)}$$

In step S1002, it is determined whether subdividing the bounding box into N intervals will lead to a discrete gamut that satisfies a predetermined condition that its volume is at the same order of magnitude as the volume of the continuous gamut. If N is sufficiently low such that the predetermined condition is satisfied ("YES" at step S1002), then in step S1011, the bounding box is subdivided into a collection of discrete cells such that there are N (i.e., $N_{max}$) intervals in each dimension.

If N is not sufficiently low ("NO" at step S1002), then in step S1003, N is set to the minimum value (i.e., $N_{min}$) that satisfies Equation 3, or more precisely $$N_{min} = \left\lceil \max_{i=1,2,\ldots,n} \frac{M_i - m_i}{T} \right\rceil,$$

and thereafter processing proceeds to step S1004. In step S1004, it is determined whether subdividing the bounding box into N intervals will lead to a discrete gamut that satisfies the predetermined condition that its volume is at the same order of magnitude as the volume of the continuous gamut.

If N is still not sufficiently low ("NO" at step S1004), then in step S1012, an error condition is generated, indicating that there are not enough ICS sample points to span the continuous gamut.

If N is sufficiently low such that the predetermined condition is satisfied ("YES" at step S1004), then a binary search is performed to increase the value of N such that N is the optimal value that both satisfies Equation 3, Equation 6 and the predetermined condition.

In particular, in step S1005, the lower bound LO and the upper bound HI of the binary search range are set. Specifically, LO is set to the minimum value (i.e., $N_{min}$) that satisfies Equation 3, and HI is set to the maximum value (i.e., $N_{max}$) that satisfies Equation 6. In step S1006, it is determined whether there are integer values between LO and HI (i.e., it is determined whether HI>LO+1). If there are no integer values between LO and HI, i.e., LO and HI are consecutive integers ("NO" at step S1006), then in step S1013, N is chosen to be LO, and the bounding box is subdivided into a collection of discrete cells such that there are LO intervals in each dimension.

If there are integer values between LO and HI ("YES" at step S1006), then in step S1007, N is chosen to be the largest integer not greater than the average of HI and LO, i.e., the mid-point of HI and LO.

In step S1008, it is determined whether subdividing the bounding box into N intervals will lead to a discrete gamut that satisfies the predetermined condition that its volume is at the same order of magnitude as the volume of the continuous gamut. If N is sufficiently low such that the predetermined condition is satisfied ("YES" at step S1008), then in step S1009, LO is increased (i.e., LO is set to N), and processing returns to step S1006.

If N is not sufficiently low ("NO" at step S1008), then in step S1010, HI is decreased (i.e., HI is set to N), and processing returns to step S1006.

The process of adjusting LO and HI continues iteratively until step S1006 results in a "NO", i.e., there are no integer values between LO and HI, or LO and HI are consecutive integers.

FIG. 10B shows the process of determining whether subdividing the bounding box into N intervals will lead to a discrete gamut that satisfies the predetermined condition that its volume is at the same order of magnitude as the volume of the continuous gamut. This process corresponds to steps S1002, S1004, and S1008, as described above with respect to FIG. 10A.

In step S1021, the current value of N and the ICS sample points are used to construct a discrete spectral gamut descriptor as described above with respect to steps S806 to S818 of FIG. 8. In step S1022, the number of cells, l, in the cell index list of the discrete spectral gamut descriptor is determined, and the volume of the discrete spectral gamut using the current N is calculated using Equation 8.

$$l \cdot \prod_{i=1}^{n} \frac{M_i - m_i}{N} \qquad \text{(Equation 8)}$$

As shown in Equation 8, l represents the number of cells in the cell index list. The volume $V_0$ of the continuous spectral gamut of the destination device (as described by a continuous spectral gamut boundary descriptor) is estimated. The continuous spectral gamut boundary descriptor may be the convex hull of the whole set of ICS sample points. Alternatively, if the whole set of ICS sample points is not available (for example, in an embodiment in which each ICS sample point is generated and processed on the fly, as will be described below with respect to FIG. 11) a "crude" convex hull can be obtained by generating ICS sample points from a more sparse sampling (i.e., a coarse sampling) of the device space of the destination device, and the "crude" convex hull can be used to estimate the volume $V_0$. In step S1023, the volume of the discrete spectral gamut using the current N is compared to the volume $V_0$ of the continuous spectral gamut of the destination device to determine whether the volume of the discrete spectral gamut using the current N is of the same order of magnitude as $V_0$, e.g., to determine whether Equation 9 (i.e., the predetermined condition) is satisfied.

$$V_0 / 10 \le l \cdot \prod_{i=1}^{n} \frac{M_i - m_i}{N} \le 10 V_0 \qquad \text{(Equation 9)}$$

If the volume of the discrete spectral gamut using the current N is of the same order of magnitude as $V_0$ ("YES" at step S1023), then N is sufficiently low. If the volume of the discrete spectral gamut using the current N is not of the same order of magnitude as $V_0$ ("NO" at step S1023) then N is not sufficiently low.

Figure 11:
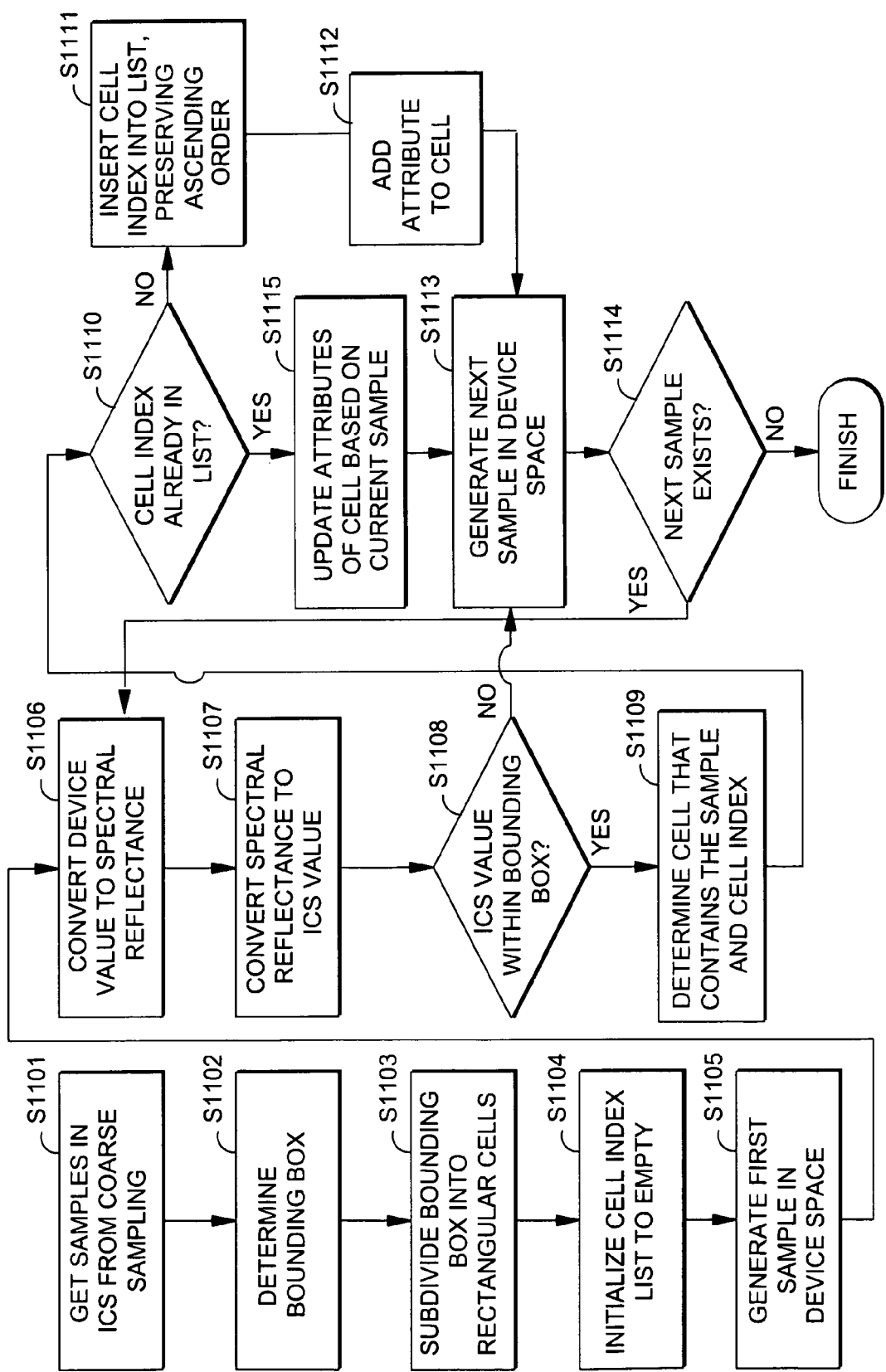
FIG. 11 is a flow diagram for explaining construction of a discrete spectral gamut descriptor, according to another example embodiment.

FIG. 11 is a flow diagram for explaining construction of a discrete spectral gamut descriptor according to another example embodiment. The process steps shown in FIG. 11 are computer-executable process steps stored on a computer-readable memory medium such as on a disk, and are executed by a CPU of a host computer, so as to construct a discrete spectral gamut descriptor. In the example embodiment, the destination device is a multi-ink printer, but in other embodiments, the destination device can be, for example, a reflective display device or a display device with electronic inks.

Briefly, according to the process steps shown in FIG. 11, sample points are generated on the fly. Since the number of samples is typically very large (to ensure that the whole gamut is covered), a significant amount of memory (e.g., RAM) may be needed to store all of the sample points. By generating sample points on the fly, and processing a generated sample point before generating a next sample point, less memory may be needed to construct the discrete spectral gamut descriptor.

In more detail, in step S1101 sample points from a more sparse sampling (i.e., a coarse sampling) of the device space of the destination device are generated. The purpose of the coarse sampling is to determine an approximate bounding box. Contrary to the embodiment in FIG. 8, where a precise bounding box can be determined from the set of ICS samples, samples are generated on the fly and discarded after processing in this embodiment. Therefore an approximate bounding box is determined first using a coarse sampling. A number of sampling steps are generated for each ink. For a coarse sampling, the number of sampling steps, s, generated for each ink is lower as compared to the number of sampling steps generated for each ink for a much finer sampling that spans the gamut of the destination device.

For example, in the case of a 6-ink color printer wherein the same number of sampling steps are generated for each ink, for a coarse sampling, the number of sampling steps s may be 5, and a total of $s^6 = 15,625$ ink samples may be generated. In comparison, for a finer sampling intended to span the gamut of the destination device, the number of sampling steps s may be 20, and a total of $s^6 = 64,000,000$ ink samples may be generated.

In an example embodiment, the sample points are generated by performing a uniform sampling of the destination device dependent color space. In another example embodiment, the sample points are generated by performing a uniform sampling in each channel, but with a different number of steps in each channel. In another example embodiment, each channel is linearized, and the sample points are generated by performing a uniform sampling in each linearized channel of the destination device dependent color space. In another example embodiment, each channel is linearized, and the sample points are generated by performing a uniform sampling in each linearized channel, but with a different number of steps in each channel.

The generated sample points are filtered for overinking based on constraints, if any constraints are specified. For example, a constraint can limit the ink amount for filtered sample points. Typical ink limits are from 200% to 250%. Sample points having ink amounts that exceed the ink limits are not used.

The filtered sample points in the device dependent color space are passed to the forward device conversion module of the destination device. The forward device conversion module of the destination device converts the received sample points in the device dependent color space into spectral reflectance values in the spectral reflectance space, by using a forward destination device model. Alternatively, the filtered sample points may be printed and measured spectrally.

The spectral reflectance values in the spectral reflectance space are passed to an ICS conversion unit which converts the received spectral reflectance values into spectrally-based ICS values in the spectrally-based ICS, thus generating ICS sample points. In the example embodiment, the ICS sample points are stored on a computer-readable memory medium such as in a RAM. Since a coarse sampling is used to generate the sample points, less sample points are generated, as compared to a finer sampling, and less memory may be needed to store the ICS sample points.

For example, in the case of a 6-ink color printer wherein a coarse sampling is performed with 5 sampling steps in each ink, 15,625 ink samples are generated. In comparison, in a case where a finer sampling is performed with 20 sampling steps in each ink, 64,000,000 ink samples are generated. Therefore, less memory is needed to store the ICS points generated by performing a coarse sampling with 5 sampling steps in each ink, as compared to a finer sampling performed with 20 sampling steps in each ink.

In step S1102, a maximum coordinate value and a minimum coordinate value in each dimension of the spectrally-based ICS are calculated to define a bounding box that includes the ICS sample points generated from the coarse sampling, in a manner similar to that described above for step S805 of FIG. 8. In the embodiment, so as to optimize performance, the resource, such as allocated space in computer-readable memory medium, e.g, RAM, used for storing the ICS sample points from the coarse sampling may be released after this step. In step S1103, the bounding box is subdivided into a collection of discrete cells in a manner similar to that described above for step S807 of FIG. 8, and in step S1104, the cell index list is initialized to be an empty list. Thereafter, a process for generating sample points using a finer sampling that spans the gamut of the destination device begins. For example, the finer sampling may have 20 sampling steps in each ink, as compared to, for example, 5 steps in each ink used in the coarse sampling performed in step S1101.

In step S1105, the first sample point in the device space of the destination device is generated by the finer sampling process. After generating the first sample point, and before generating another sample point, processing proceeds to step S1106, in which the forward device conversion module of the destination device converts the first sample point in the device dependent color space into a spectral reflectance value in the spectral reflectance space, by using a forward destination device model. In step S1107, the spectral reflectance value in the spectral reflectance space is passed to an ICS conversion unit which converts the received spectral reflectance value into a spectrally-based ICS value in the spectrally-based ICS, thus generating the first ICS sample point. The first ICS sample point is stored on a computer-readable memory medium such in a RAM.

In step S1108, it is determined whether the first ICS sample point is within the bounding box determined in step S1102. If the first ICS sample point is not within the bounding box ("NO" at step S1108), then processing proceeds to step S1113. In step S1113, the first ICS sample point is discarded (i.e., removed from the computer-readable memory medium, e.g, RAM), and a next sample point in the device space of the destination device is generated by the finer sampling. In step S1114, it is determined whether a next sample point is successfully generated in step S1113. If a next sample point is successfully generated ("YES" at step S1114), then processing returns to step S1106, and the next sample point is processed. If a next sample point is not successfully generated ("NO" at step S1114), then construction of the discrete spectral gamut descriptor is complete.

If the first ICS sample point is within the bounding box ("YES" at step S1108), then processing proceeds to step S1109. In step S1109, the cell that contains the first ICS sample point is determined, and a 1-dimensional cell index J for the determined cell is generated, in a manner similar to the manner described above with respect to step S810 of FIG. 8. Thereafter, processing proceeds to step S1110, where it is determined whether the index J for the determined cell is already in the cell index list, for example, by performing a binary search, or any other suitable type of search.

If it is determined that the index J is not already in the cell index list ("NO" at step S1110), then in step S1111, the index J is recorded into the cell index list to indicate that the corresponding cell is occupied. In the example embodiment, the index J is recorded into the cell index list by inserting it in a position in the list so as to preserve an ascending sort order of the list. Thereafter, processing proceeds to step S1112. In step S1112, an attribute is associated with the index J. The attribute provides representative information about the ICS sample point. In the example embodiment, the attribute is a device value, such as a CMYKRG ink combination for a CMYKRG printer, for the ICS sample point. The device value is used as an initial guess for an inverse destination device conversion module that performs conversion by using an inverse destination device model. In other embodiments, the attribute can include other types of information, such as, for example, statistics of the ICS sample points within the cell. After the attribute is associated with the index J, processing proceeds to step S1113.

If it is determined that the index J is already in the cell index list ("YES" at step S1110), (for example, when a previously processed sample point is contained in the current cell), then processing proceeds to step S1115. In step S1115, the original attribute associated with the index J is updated if the attribute associated with the current ICS sample point is better than original attribute, based on specified criteria, in a manner similar to that described above with respect to step S818 of FIG. 8. Thereafter, processing proceeds to step S1113.

As described above, in step S1113, the first (or current) ICS sample point is discarded (i.e., removed from the computer-readable memory medium, e.g, RAM), and a next sample point in the device space of the destination device is generated by the finer sampling process using the forward destination device conversion module, which uses the forward destination device model. In step S1114, it is determined whether a next sample point is successfully generated in step S1113. If a next sample point is successfully generated ("YES" at step S1114) (i.e., the finer sampling process continues), then processing returns to step S1106, and the next sample point is processed. If a next sample point is not successfully generated ("NO" at step S1114) (i.e., the finer sampling process ends), then construction of discrete spectral gamut descriptor is complete.

Figure 12:
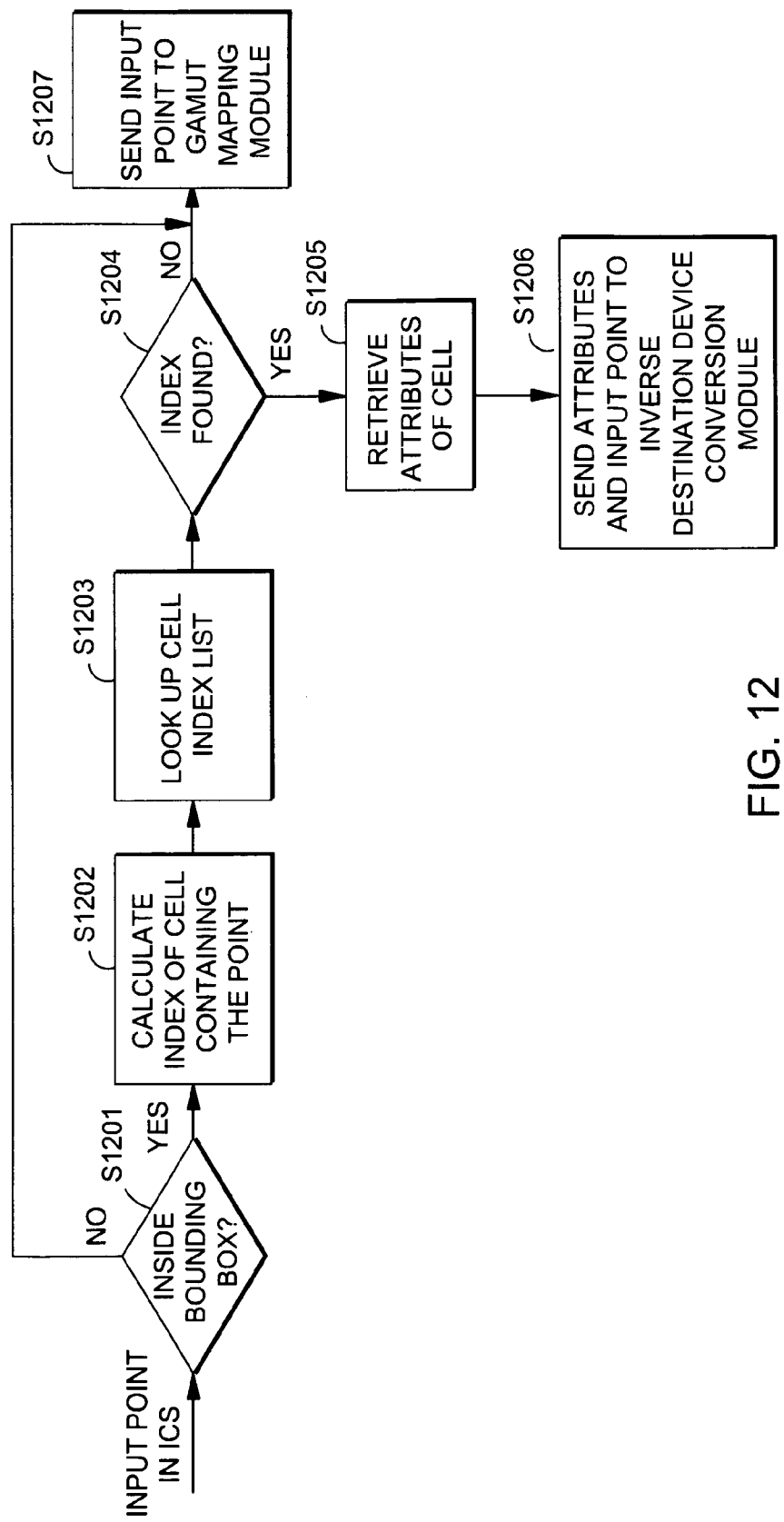
FIG. 12 is a flow diagram for explaining a gamut checking process, according to an example embodiment.

FIG. 12 is a flow diagram for explaining the process performed by gamut checking module 152 of FIG. 7 in more detail. As described above, gamut checking module 152 determines whether a spectrally-based ICS value is within a spectral gamut of an intended destination device. In step S1201, gamut checking module 152 receives a spectrally-based ICS value, and determines whether the spectrally-based ICS value is inside the bounding box determined in step S805 of FIG. 8. As described above with respect to FIG. 8, the coordinates of the bounding box determined in step S805 are stored in RAM 116. Gamut checking module 152 retrieves the stored coordinates that define the bounding box from RAM 116, and based on these coordinates, determines whether the spectrally-based ICS value is inside the bounding box.

If the spectrally-based ICS value is not inside the bounding box ("NO" at step S1201), then gamut checking module 152 determines that the spectrally-based ICS value is not included in discrete spectral gamut descriptor 165, and processing proceeds to step S1207. In step S1207, gamut checking module 152 passes the spectrally-based ICS value to gamut mapping module 153.

If the spectrally-based ICS value is inside the bounding box ("YES" at step S1201), then gamut checking module 152 calculates the index of the cell in the subdivided bounding box that contains the spectrally-based ICS value. Gamut checking module 152 calculates the index of the cell in a manner similar to that described above with respect to step S810 of FIG. 8.

In step S1203, gamut checking module 152 searches for the calculated index in the cell index list of discrete spectral gamut descriptor 165. Since the cell index list is sorted in ascending order, a binary search is performed that may quickly locate the cell. If the calculated index is not in the cell index list ("NO" at step S1204), then processing proceeds to step S1207, where gamut checking module 152 passes the spectrally-based ICS value to gamut mapping module 153.

If the calculated index is in the cell index list ("YES" at step S1204), then processing proceeds to step S1205. In step S1205, gamut checking module 152 retrieves the attribute associated with the cell index from discrete spectral gamut descriptor 165. Thereafter, processing proceeds to step S1206, where gamut checking module 152 passes the retrieved attribute and the spectrally-based ICS value to inverse destination device conversion module 154.

In a case where a spectrally-based ICS value is outside the discrete spectral gamut, it is still often desirable to find a closest cell in the discrete gamut, so that the attributes from that cell can be retrieved for use in the inverse destination device conversion module (e.g., 154 of FIG. 7). This is the case because it is possible that the spectrally-based ICS value is actually in gamut. The discrete spectral gamut is only an approximation of the true gamut. In such cases, the spectrally-based ICS value may be invertible by the inverse destination device conversion module, so it is still desirable to provide an initial guess to it.

Figure 13:
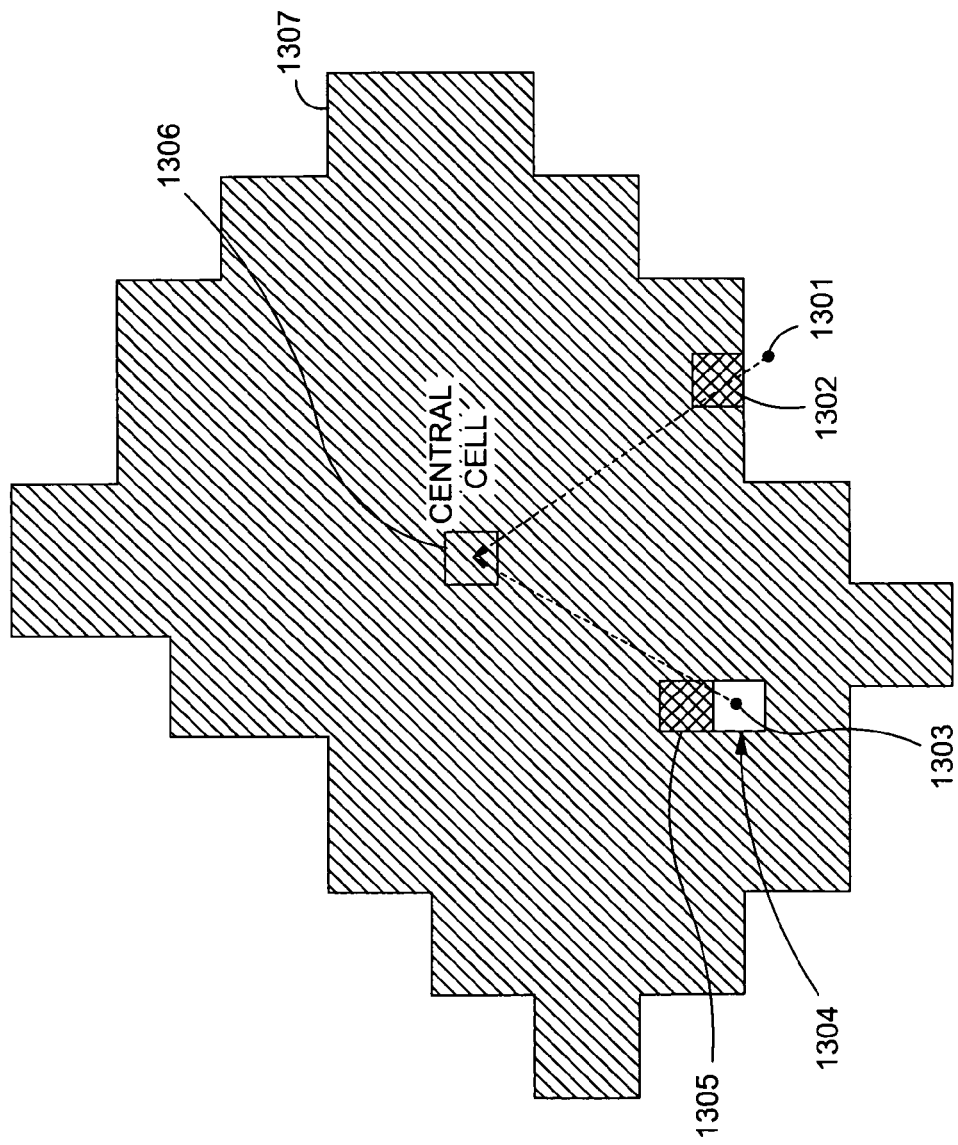
FIG. 13 is an illustration for explaining determination of a nearest cell from an out-of-discrete-gamut point, according to an example embodiment.

As described above with respect to step S813 of FIG. 8, a Central Cell is identified. The nearest cell from an out-of-discrete-gamut point is determined to be the first cell encountered along the line from the point to the center of the Central Cell. This is illustrated in FIG. 13, which shows Central Cell 1306 in discrete spectral gamut 1307. The nearest cell from out-of-discrete-gamut point 1301 is cell 1302, and the nearest cell from out-of-discrete-gamut point 1303 is cell 1305. As shown in FIG. 13, out-of-discrete-gamut point 1303 is a point that should be in gamut but is located in a "hole" 1304 in the discrete gamut 1307. Hole 1304 may be caused, for example, by insufficient sampling points.

Figure 14:
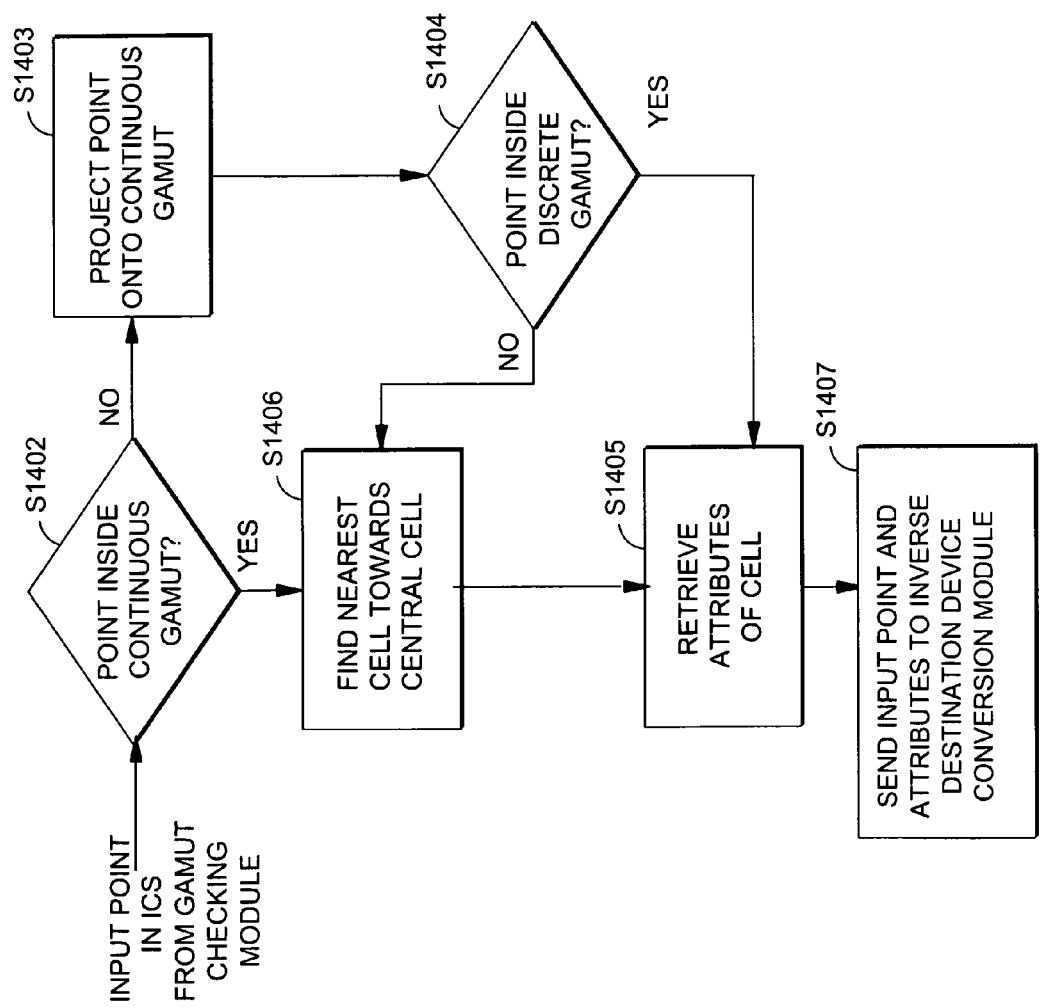
FIG. 14 is a flow diagram for explaining a gamut mapping process, according to an example embodiment.

FIG. 14 is a flow diagram for explaining the process performed by a gamut mapping module 153 of FIG. 7 in more detail. As described above, gamut mapping module 153 performs spectral gamut mapping to map a spectrally-based ICS color value onto the spectral gamut of the destination device.

In step S1402, gamut mapping module 153 receives the spectrally-based ICS value from gamut checking module 152 and determines if it is within the continuous gamut, using destination gamut boundary descriptor 166.

If the spectrally-based ICS value is within the continuous gamut ("YES" at step S1402), then in step S1406, gamut mapping module 153 retrieves the coordinates of the Central Cell from RAM 116, and determines the nearest discrete gamut cell from the spectrally-based ICS value (i.e., point). As described above, the nearest discrete gamut cell is determined to be the first cell encountered along the line from the point to the center of the Central Cell. In step S1405, attributes of the nearest discrete gamut cell are retrieved from discrete gamut descriptor 165, and in step S1407, the retrieved attributes and the spectrally-based ICS value are passed to inverse destination device conversion module 154.

If the spectrally-based ICS value is not within the continuous gamut ("NO" at step S1402), then in step S1403, gamut mapping module 153 projects the spectrally-based ICS value onto the continuous spectral gamut, and processing proceeds to step S1404.

In step S1404, gamut mapping module 153 determines whether the spectrally-based ICS value is within the discrete spectral gamut by performing a process similar to the process described above with respect to FIG. 12 for gamut checking module 152. In particular, gamut mapping module 153 retrieves the stored coordinates that define the bounding box from RAM 116, and based on these coordinates, determines whether the spectrally-based ICS value is inside the bounding box. If the spectrally-based ICS value is not inside the bounding box, then the spectrally-based ICS value is not inside the discrete spectral gamut. If the spectrally-based ICS value is inside the bounding box, gamut mapping module 153 calculates the index of the cell containing the spectrally-based ICS value, and searches for the index in the cell index list of discrete gamut descriptor 165. If the index is not in the cell index list, then the spectrally-based ICS value is not inside the discrete spectral gamut. On the other hand, if the index is in the cell index list, then the spectrally-based ICS value is inside the discrete spectral gamut.

If the spectrally-based ICS value is within the discrete spectral gamut ("YES" at step S1404), then processing proceeds to step S1405. In step S1405, attributes of the cell are retrieved from discrete gamut descriptor 165, and in step S1407, the retrieved attributes and the spectrally-based ICS value are passed to inverse destination device conversion module 154.

If the spectrally-based ICS value is not within the discrete spectral gamut ("NO" at step S1404), then processing proceeds to step S1406. In step S1406, gamut mapping module 153 retrieves the coordinates of the Central Cell from RAM 116, and determines the nearest discrete gamut cell from the spectrally-based ICS value (i.e., point). As described above, the nearest discrete gamut cell is determined to be the first cell encountered along the line from the point to the center of the Central Cell. In step S1405, attributes of the nearest discrete gamut cell are retrieved from discrete gamut descriptor 165, and in step S1407, the retrieved attributes and the spectrally-based ICS value are passed to inverse destination device conversion module 154.

As described above, with respect to FIGS. 7, 12 and 14, SCMM 135 checks the discrete spectral gamut first, to determine whether a spectrally-based ICS value is included in the discrete spectral gamut, before checking the continuous gamut and performing spectral gamut mapping. If the spectrally-based ICS value is determined to be inside the discrete spectral gamut, then the attributes of the cell containing the spectrally-based ICS value, and the spectrally-based ICS value itself, are passed to the inverse destination device conversion module for inversion, without checking the continuous gamut at all (and without performing spectral gamut mapping at all). If the spectrally-based ICS value is outside the discrete spectral gamut, then the usual checking and projecting (if out of gamut) on to the continuous gamut will then take place. In this manner, the frequencies of checking the continuous gamut and projecting onto the continuous gamut may be reduced, thereby reducing the computational complexity to convert the spectrally-based ICS value into a destination device value in the destination device color space.

Figure 15:
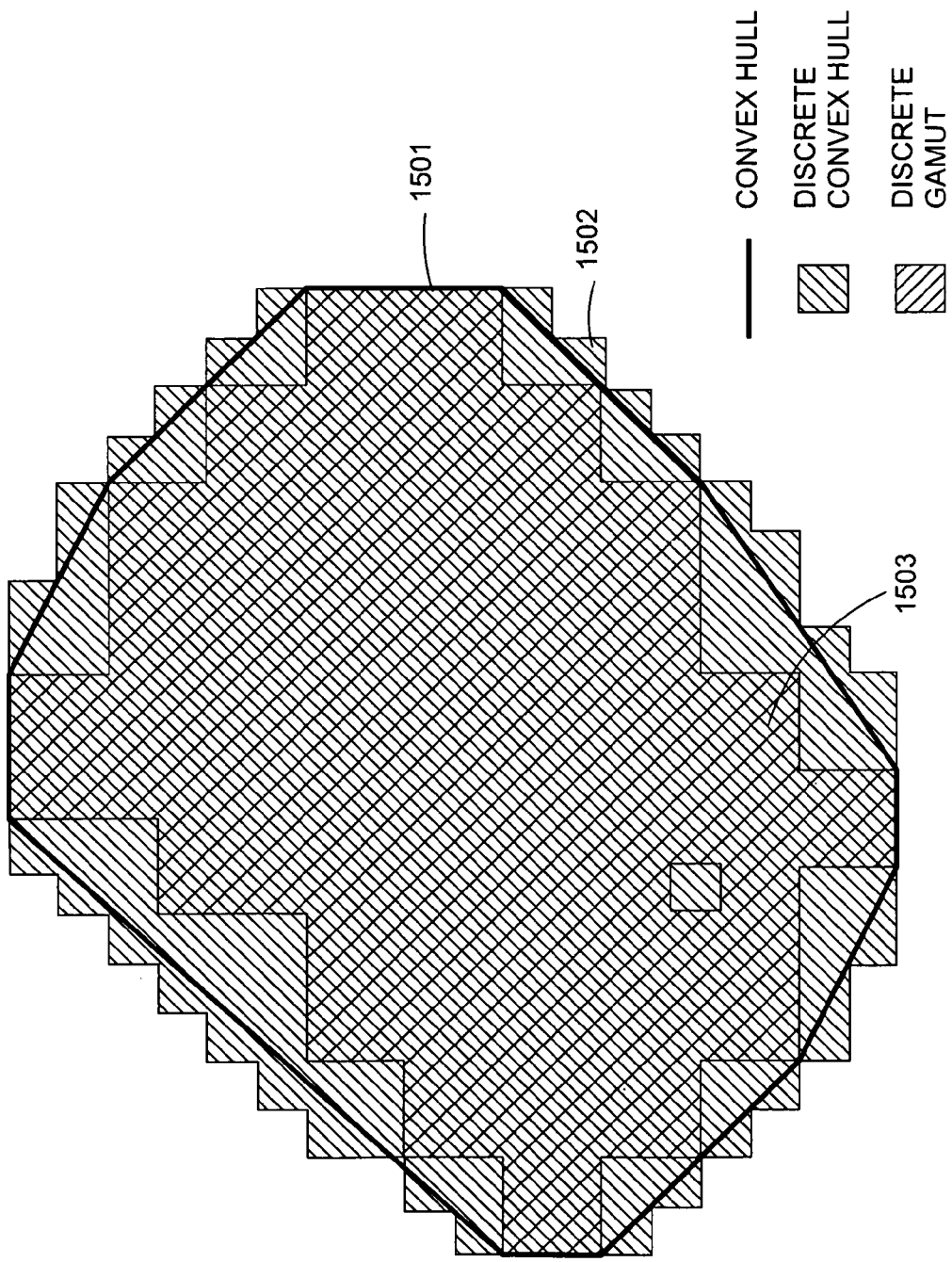
FIG. 15 is an illustration for explaining a process for gamut checking and gamut mapping, according to an example embodiment.

FIG. 15 illustrates a discrete convex hull that is used by a process for performing both gamut checking and gamut mapping, according to another embodiment in which the discrete convex hull is checked before checking either the discrete spectral gamut or the continuous gamut.

The discrete spectral convex hull (e.g., 1502) is constructed by first constructing the continuous convex hull (e.g., 1501) to the discrete spectral gamut (e.g., 1503). The continuous convex hull is discretized by determining all the cells that have a nonempty intersection with the convex hull. A cell index is determined for each cell, and the cell indices are added to a discrete convex hull index list, which is stored on a computer-readable memory medium, such as, for example, a hard disk, a memory, or any other suitable type of computer-readable memory medium.

Figure 16:
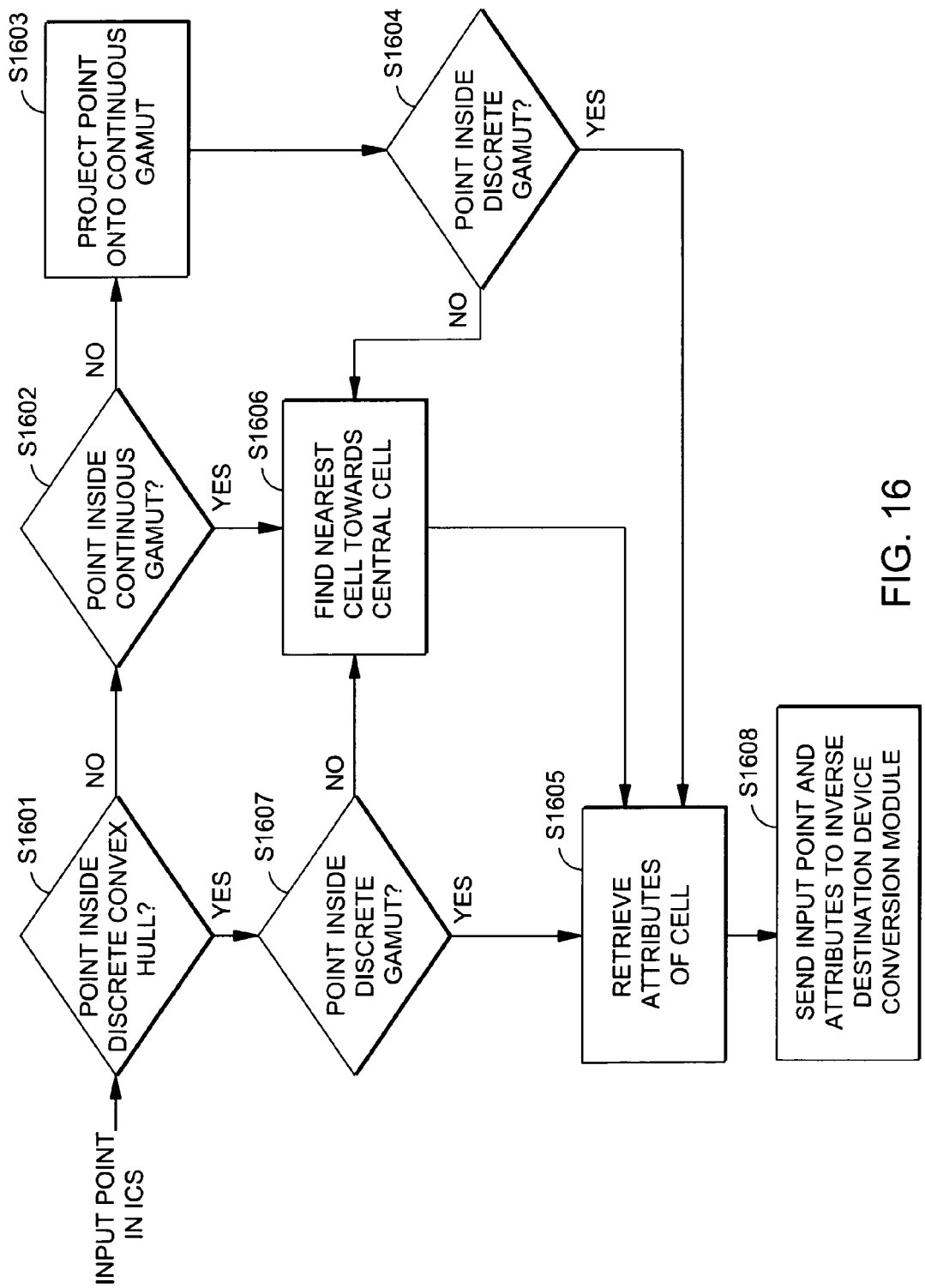
FIG. 16 is a flow diagram for explaining a process for gamut checking and gamut mapping, according to an example embodiment.

FIG. 16 is a flow diagram for explaining an embodiment of a process for performing both gamut checking and gamut mapping in which the discrete convex hull is checked before checking either the discrete spectral gamut or the continuous gamut. In the embodiment shown in FIG. 16, the discrete convex hull is checked first to determine whether a spectrally-based ICS value is included in the discrete convex hull, before determining whether the spectrally-based ICS value is included in the discrete spectral gamut.

In step S1601, a spectrally-based ICS value (i.e., input point in ICS) is received, and a determination is made as to whether the spectrally-based ICS value is included in the discrete convex hull. This determination is made by performing a process similar to the process described above with respect to FIG. 12. In particular, stored coordinates that define a bounding box of the discrete spectral gamut (which is also the bounding box for the discrete convex hull) are retrieved from a memory, such as, for example, a RAM. Based on these coordinates, it is determined whether the spectrally-based ICS value is inside the bounding box. If the spectrally-based ICS value is not inside the bounding box, then the spectrally-based ICS value is not inside the discrete convex hull. If the spectrally-based ICS value is inside the bounding box, then the process proceeds by calculating an index of a cell containing the spectrally-based ICS value, and searching for the index in the discrete convex hull index list. If the index is not in the discrete convex hull index list, then the spectrally-based ICS value is not inside the discrete convex hull. On the other hand, if the index is in the cell index list, then the spectrally-based ICS value is inside the discrete convex hull.

If the spectrally-based ICS value is within the discrete convex hull ("YES" at step S1601), then processing proceeds to step S1607. In step S1607, it is determined whether the spectrally-based ICS value is within the discrete spectral gamut by performing a process similar to the process described above with respect to FIG. 12 for gamut checking module 152. Since the spectrally-based ICS value is inside the discrete convex hull in step S1607, it is automatically inside the bounding box of the discrete spectral gamut. The index of the cell containing the spectrally-based ICS value is calculated, and a search is performed to search for the index in the cell index list of the discrete spectral gamut descriptor. If the index is not in the cell index list, then the spectrally-based ICS value is not inside the discrete spectral gamut. On the other hand, if the index is in the cell index list, then the spectrally-based ICS value is inside the discrete spectral gamut.

If the spectrally-based ICS value is within the discrete spectral gamut ("YES" at step S1607), then processing proceeds to step S1605. In step S1605, attributes of the cell are retrieved from the discrete gamut descriptor, and in step S1608, the retrieved attributes and the spectrally-based ICS value are passed to the inverse destination device conversion module.

If the spectrally-based ICS value is not within the discrete spectral gamut ("NO" at step S1607), then processing proceeds to step S1606. In step S1606, the stored coordinates of a Central Cell are retrieved from a computer-readable memory, such as, for example, a RAM. The Central Cell is determined and stored in a manner similar to that described above with respect to step S813 of FIG. 8. The nearest discrete gamut cell from the spectrally-based ICS value (i.e., point) is determined. As described above, the nearest discrete gamut cell is determined to be the first cell encountered along the line from the point to the center of the Central Cell. In step S1605, attributes of the nearest discrete gamut cell are retrieved from the discrete gamut descriptor, and in step S1608, the retrieved attributes and the spectrally-based ICS value are passed to the inverse destination device conversion module.

If the spectrally-based ICS value is not within the discrete convex hull ("NO" at step S1601), then processing proceeds to step S1602. In step S1602, it is determined whether the spectrally-based ICS value is within the continuous gamut, using a continuous destination gamut boundary descriptor, such as, for example, a convex hull.

If the spectrally-based ICS value is within the continuous gamut ("YES" at step S1602), then processing proceeds to step S1606. If the spectrally-based ICS value is not within the continuous gamut ("NO" at step S1602), then in step S1603, the spectrally-based ICS value is projected onto the continuous spectral gamut, and processing proceeds to step S1604.

In step S1604, it is determined whether the spectrally-based ICS value is within the discrete spectral gamut by performing a process similar to the process described above with respect to FIG. 12 for gamut checking module 152.

If it is determined that the spectrally-based ICS value is within the discrete spectral gamut ("YES" at step S1604), then processing proceeds to step S1605. Otherwise, if it is determined that the spectrally-based ICS value is not within the discrete spectral gamut ("NO" at step S1604), then processing proceeds to step S1606.

Figure 17:
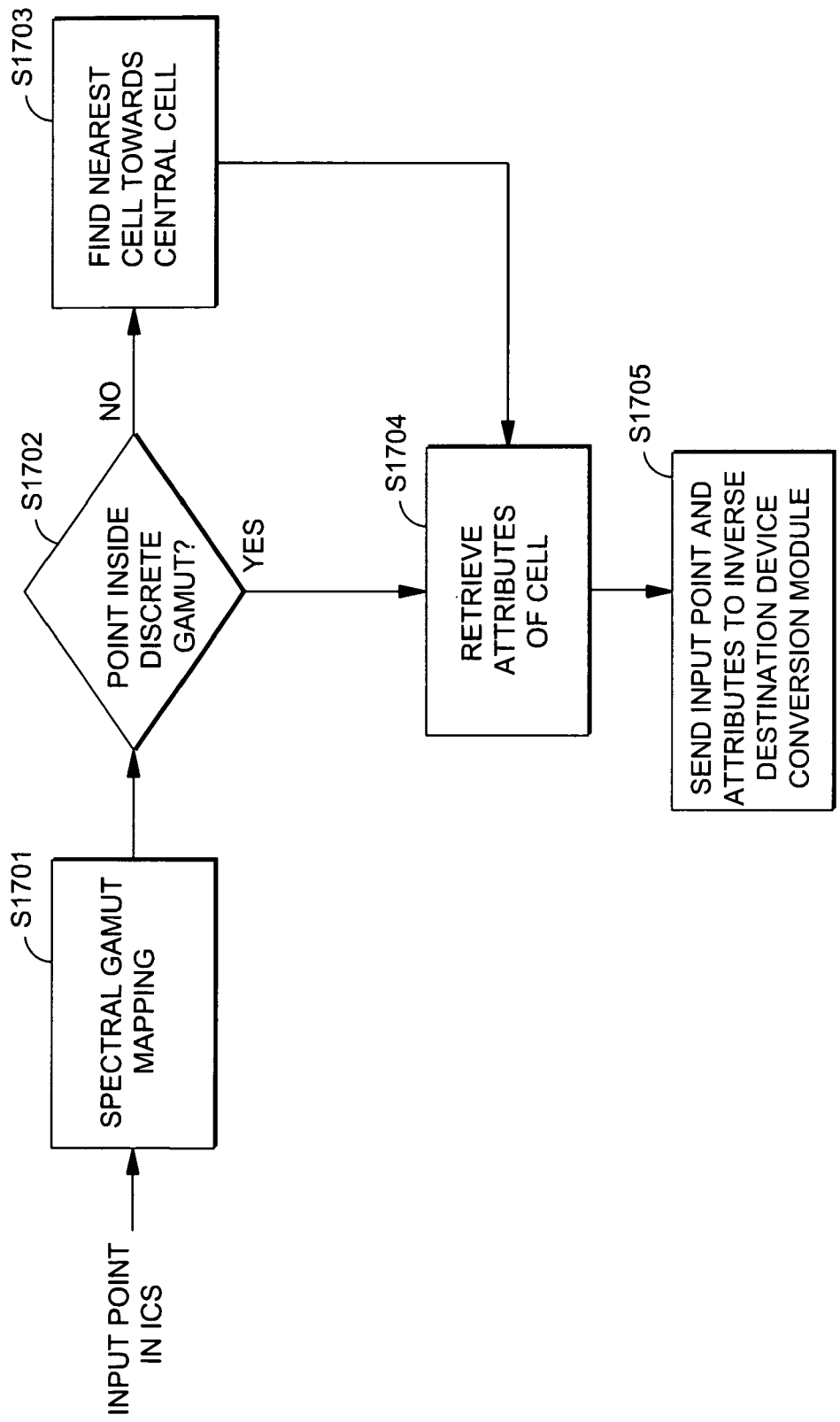
FIG. 17 is a flow diagram for explaining a process for performing gamut mapping, according to an example embodiment.

FIG. 17 is a flow diagram for explaining an embodiment of a process for performing gamut mapping in which the discrete spectral gamut is checked after performing spectral gamut mapping. The arrangement of this embodiment is particularly suitable for spectral gamut mapping that may not aim at minimizing spectral errors, but may instead aim at achieving other goals, such as a pleasing effect. In the embodiment illustrated in FIG. 17, spectral gamut mapping is first applied to the spectrally-based ICS value (i.e., input point in ICS) in step S1701. The spectral gamut mapping can be performed using any type of gamut boundary construct, such as, for example, a convex hull, or using any algorithm, such as, for example, a compression algorithm, a clipping algorithm, a projection algorithm, or the like. Despite the general nature of the spectral gamut mapping in this embodiment, such mapping is still required to map the ICS value so that the result is within the spectral gamut. However, for the sake of eventually inverting the gamut-mapped spectrally-based ICS value into a destination device value, the inverse destination device conversion module requires an initial guess. The initial guess is available for gamut-mapped spectrally-based ICS values that are inside the discrete spectral gamut.

Therefore, it is determined whether the gamut-mapped spectrally-based ICS value is inside the discrete spectral gamut in step S1702. If the gamut-mapped spectrally-based ICS value is inside the discrete spectral gamut ("YES" at step S1702), then the corresponding attributes are retrieved in step S1704. Thereafter, in step S1705, the retrieved attributes and the spectrally-based ICS value are passed to the inverse destination device conversion module, which uses the attributes as an initial guess to convert the spectrally-based ICS value into a destination device value. If the gamut-mapped spectrally-based ICS value is not inside the discrete spectral gamut ("NO" at step S1702), then processing proceeds to step S1703.

In step S1703, the stored coordinates of a Central Cell are retrieved from a computer-readable memory, such as, for example, a RAM. The Central Cell is determined and stored in a manner similar to that described above with respect to step S813 of FIG. 8. The nearest discrete gamut cell from the spectrally-based ICS value (i.e., point) is determined. As described above, the nearest discrete gamut cell is determined to be the first cell encountered along the line from the point to the center of the Central Cell. In step S1704, attributes of the nearest discrete gamut cell are retrieved from the discrete gamut descriptor, and in step S1705, the retrieved attributes and the spectrally-based ICS value are passed to the inverse destination device conversion module.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A color management method which converts a source-side color in a source device dependent color space into a counterpart destination-side color in a destination device dependent color space, said method comprising:

accessing a multi-spectral color image in the source device dependent color space generated using a multi-spectral source device;

converting the multi-spectral color image into a spectral reflectance representation in a spectral reflectance space;

converting the spectral reflectance representation into a spectrally-based Interim Connection Space (ICS) representation in a spectrally-based ICS;

determining whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device;

in response to a determination that the spectrally-based ICS value is included in the discrete spectral gamut descriptor, converting the spectrally-based ICS value into a destination-side color in a destination device dependent color space of the destination device; and in response to a determination that the spectrally-based ICS value is not included in the discrete spectral gamut descriptor, spectrally gamut mapping the spectrally-based ICS color value onto the spectral gamut of the destination device, and converting the gamut-mapped spectrally-based ICS value into a destination-side color in the destination device dependent color space of the destination device, wherein the discrete spectral gamut descriptor represents the spectral gamut of the destination device as a collection of discrete cells of a subdivided bounding box that includes a set of sample points in the spectrally-based ICS that span the spectral gamut of the destination device, and wherein each cell has an attribute that represents an initial guess for an iterative search for a destination-side color for ICS values included in the cell, and the attribute is used to convert ICS values included in the cell into destination-side colors.

2. The color management method according to claim 1, wherein the discrete spectral gamut descriptor is constructed by performing the steps of:

generating sample points that span the destination device dependent color space of the destination device;

converting each of the generated sample points into spectral reflectance values in the spectral reflectance space;

converting the spectral reflectance values into spectrally-based ICS values in the spectrally-based ICS;

calculating a maximum coordinate value and a minimum coordinate value in each dimension of the spectrally-based ICS to define the bounding box that includes the ICS sample points;

subdividing the bounding box into the collection of discrete cells such that there are N intervals in each dimension;

generating a list of cell indices that represents the collection of discrete cells in the discrete spectral gamut descriptor, wherein the list is generated by generating a cell index for each cell including one or more sample points based on the ICS coordinates of the sample points, and adding the generated cell indices to the list of cell indices;

sorting the list of cell indices; and associating an attribute with each index in the list of cell indices, wherein each attribute provides representative information about sample points included in the cell corresponding to the associated index.

3. The color management method according to claim 2, wherein in the sample point generating step, the sample points are filtered based on specified constraints.

4. The color management method according to claim 2, wherein each attribute is a device value for a representative sample point lying inside the corresponding cell.

5. The color management method according to claim 4, wherein the representative sample point is a sample point that is closest to the center of the cell.

6. The color management method according to claim 4, wherein the representative sample point is a sample point that has a lowest value in the black channel.

7. The color management method according to claim 4, wherein the representative sample point is a sample point that has a highest value in the black channel.

8. The color management method according to claim 4, wherein the representative sample point is a sample point that has the highest purity, in the sense that it has the most number of zero channels.

9. The color management method according to claim 2, wherein in the determining step it is determined whether the spectrally-based ICS value is included in the bounding box of the discrete spectral gamut descriptor, and a determination that the spectrally-based ICS value is not included in the bounding box corresponds to a determination that the spectrally-based ICS value is not included in the discrete spectral gamut descriptor, and wherein in response to a determination that the spectrally-based ICS value is included in the bounding box, it is further determined whether the spectrally-based ICS value is included in a cell of the discrete spectral gamut descriptor, and a determination that the spectrally-based ICS value is not included in a cell of the discrete spectral gamut descriptor corresponds to a determination that the spectrally-based ICS value is not included in the discrete spectral gamut descriptor.

10. The color management method according to claim 9, wherein in the determining step, it is determined whether the spectrally-based ICS value is included in a cell of the discrete spectral gamut descriptor by calculating a cell index for the spectrally-based ICS value based on ICS coordinates of the ICS value, and searching for the calculated cell index in the list of sorted cell indices, wherein a search result indicating that the calculated index is included in the list of cell indices corresponds to a determination that the spectrally-based ICS value is included in a cell of the discrete spectral gamut descriptor.

11. The color management method according to claim 10, wherein a binary search is performed to search for the calculated cell index in the list of sorted cell indices.

12. The color management method according to claim 10, wherein in response to a determination that the spectrally-based ICS value is included in the discrete spectral gamut descriptor, an attribute associated with the calculated index is retrieved, and the spectrally-based ICS value is converted into a destination-side color using the retrieved attribute as an initial guess for the destination-side color.

13. The color management method according to claim 2, wherein the coordinates of the ICS are scaled such that one unit distance in the ICS corresponds to a Just Noticeable Difference (JND), and N is chosen such that the resolution of each cell is a specified multiple of the JND.

14. The color management method according to claim 2, wherein N is chosen such that N is less than an upper bound that is directly related to storage space occupied by the discrete spectral gamut descriptor on a computer-readable storage medium.

15. The color management method according to claim 2, wherein the coordinates of the ICS are scaled such that one unit distance in the ICS corresponds to a Just Noticeable Difference (JND), and wherein N is chosen such that the resolution of each cell is a specified multiple of the JND, and such that N is less than an upper bound that is directly related to storage space occupied by the discrete spectral gamut descriptor on a computer-readable storage medium.

16. The color management method according to claim 2, wherein spectrally gamut mapping the spectrally-based ICS color value onto to within the spectral gamut of the destination device comprises the steps of:
    determining whether the spectrally-based ICS value is included in a continuous spectral gamut boundary descriptor that represents the continuous spectral gamut boundary of the destination device; and
    in response to a determination that the spectrally-based ICS value is not included in the continuous spectral gamut boundary descriptor, projecting the spectrally-based ICS color value onto within the continuous spectral gamut of the destination device.

17. The color management method according to claim 2, wherein after performing spectral gamut mapping, it is determined whether the gamut-mapped spectrally-based ICS value is included in the discrete spectral gamut descriptor,
    wherein in response to a determination that the gamut-mapped ICS value is included in the discrete spectral gamut descriptor, an attribute associated with a cell of the discrete spectral gamut descriptor that includes the gamut-mapped ICS value is retrieved, and the gamut-mapped ICS value is converted into a destination-side color using the retrieved attribute as an initial guess for the destination-side color; and
    wherein in response to a determination that the gamut-mapped ICS value is not included in the discrete spectral gamut descriptor, a cell in the discrete spectral gamut descriptor closest to the gamut-mapped ICS value is identified, an attribute associated with the identified cell is retrieved, and the gamut-mapped ICS value is converted into a destination-side color using the retrieved attribute as an initial guess for the destination-side color.

18. The color management method according to claim 1, wherein multi-spectral source devices include multi-spectral digital cameras, and wherein destination devices include multi-ink printers, reflective display devices, and electronic paper.

19. The color management method according to claim 1, wherein the discrete spectral gamut descriptor is constructed by performing the steps of:
    performing a coarse sampling to generate sample points that sparsely span the destination device dependent color space of the destination device;
    converting each of the generated sample points into spectral reflectance values in the spectral reflectance space;
    converting the spectral reflectance values into spectrally-based ICS values in the spectrally-based ICS;
    calculating a maximum coordinate value and a minimum coordinate value in each dimension of the spectrally-based ICS to define the bounding box that includes the ICS sample points;
    subdividing the bounding box into the collection of discrete cells such that there are N intervals in each dimension;
    generating a list of cell indices that represents the collection of discrete cells in the discrete spectral gamut descriptor by performing a finer sampling to generate sample points that densely span the destination device dependent color space of the destination device, and immediately processing each sample point generated from the finer sampling, without storing the sample points generated form the finer sampling.

20. The color management method according to claim 19, wherein after a new sample point is generated form the finer sampling, the new sample point is processed by performing the steps of:
    converting the generated sample point into a spectral reflectance value in the spectral reflectance space;
    converting the spectral reflectance value into a spectrally-based ICS value in the spectrally-based ICS;
    determining whether the spectrally-based ICS value is included in the bounding box;
    in response to a determination that the spectrally-based ICS value is included in the bounding box, generating a cell index for the ICS sample point based on the ICS coordinate of the sample point, and adding the generated cell index to the list of cell indices; and
    associating an attribute with the generated cell index, wherein the attribute provides representative information about sample points included in the cell corresponding to the associated index.

21. The color management method according to claim 1, further comprising:
    generating the discrete spectral gamut descriptor that represents the spectral gamut of the destination device as a collection of discrete cells of a subdivided bounding box that includes a set of sample points in the spectrally-based ICS that span the spectral gamut of the destination device, wherein each cell has an attribute that represents an initial guess for a destination-side color for ICS values included in the cell, and the attribute is used to convert ICS values included in the cell into destination-side colors;

generating a convex hull by applying a hulling algorithm to the set of sample points in the discrete spectral gamut descriptor;

generating a discrete convex hull that includes the cells in the subdivided bounding box that have a non-empty intersection with the convex hull, wherein the determining step determines whether a spectrally-based ICS value of the spectrally-based ICS representation is within a spectral gamut of an intended destination device, by determining whether the spectrally-based ICS value is included in the discrete convex hull and the discrete spectral gamut descriptor, wherein in response to a determination that the spectrally-based ICS value is included in the discrete convex hull, the spectrally-based ICS value is converted into a destination-side color in a destination device dependent color space of the destination device, and wherein in response to a determination that the spectrally-based ICS value is not included in the discrete convex hull, the spectrally-based ICS color value is spectrally gamut mapped onto the spectral gamut of the destination device, and the gamut-mapped spectrally-based ICS value is converted into a destination-side color in the destination device dependent color space of the destination device.

22. The color management method according to claim 21, wherein the determination as to whether the spectrally-based ICS value is included in the discrete convex hull is performed first before proceeding to a determination as to whether the spectrally-based ICS value is included in the discrete spectral gamut descriptor.

23. A color management module stored in a memory of a computer, wherein the color management module is executed by the computer to convert a source-side color in a source device dependent color space into a counterpart destination-side color in a destination device dependent color space, said color management module comprising:

an image generation module constructed to perform an accessing step in which a multi-spectral color image generated in the source device dependent color space using a multi-spectral source device is accessed;

a forward source device conversion module constructed to perform a converting step in which the multi-spectral color image is converted into a spectral reflectance representation in a spectral reflectance space;

an ICS conversion unit constructed to perform a converting step in which the spectral reflectance representation is converted into a spectrally-based Interim Connection Space (ICS) representation in a spectrally-based ICS;

a checking module constructed to perform a determining step in which it is determined whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device;

an inverse destination device color conversion module constructed to perform a converting step, responsive to a determination that the spectrally-based ICS value is included in the discrete spectral gamut descriptor, in which the spectrally-based ICS value is converted into a destination-side color in a destination device dependent color space of the destination device; and a gamut mapping module constructed to perform a gamut mapping step, responsive to a determination that the spectrally-based ICS value is not included in the discrete spectral gamut descriptor, in which the spectrally-based ICS color value is spectrally gamut mapped onto the spectral gamut of the destination device, and in which the gamut-mapped spectrally-based ICS value is converted into a destination-side color in the destination device dependent color space of the destination device, wherein the discrete spectral gamut descriptor represents the spectral gamut of the destination device as a collection of discrete cells of a subdivided bounding box that includes a set of sample points in the spectrally-based ICS that span the spectral gamut of the destination device, and wherein each cell has an attribute that represents an initial guess for an iterative search for a destination-side color for ICS values included in the cell, and the attribute is used to convert ICS values included in the cell into destination-side colors.

24. The color management module according to claim 23, further comprising:

a sample point generation module constructed to perform a generating step in which sample points are generated that span the destination device dependent color space of the destination device;

a sample point reflectance conversion module constructed to perform a converting step in which each of the generated sample points is converted into spectral reflectance values in the spectral reflectance space;

a sample point ICS conversion module constructed to perform a converting step in which the spectral reflectance values are converted into spectrally-based ICS values in the spectrally-based ICS;

a bounding box calculation module constructed to perform a calculating step in which a maximum coordinate value and a minimum coordinate value in each dimension of the spectrally-based ICS are calculated to define the bounding box that includes the ICS sample points;

a subdividing module constructed to perform a subdividing step in which the bounding box is subdivided into the collection of discrete cells such that there are N intervals in each dimension;

a cell index generation module constructed to perform a generating step in which a list of cell indices that represents the collection of discrete cells in the discrete spectral gamut descriptor is generated, wherein the list is generated by generating a cell index for each cell including one or more sample points based on the ICS coordinates of the sample points, and adding the generated cell indices to the list of cell indices;

a sorting module constructed to perform a sorting step in which the list of cell indices is sorted; and an attribute association module constructed to perform an associating step in which an attribute is associated with each index in the list of cell indices, wherein each attribute provides representative information about sample points included in the cell corresponding to the associated index.

25. The color management module according to claim 24, wherein the sample point generation module filters the sample points based on specified constraints.

26. The color management module according to claim 24, wherein each attribute is a device value for a representative sample point lying inside the corresponding cell.

27. The color management module according to claim 26, wherein the representative sample point is a sample point that is closest to the center of the cell.

28. The color management module according to claim 26, wherein the representative sample point is a sample point that has a lowest value in the black channel.

29. The color management module according to claim 26, wherein the representative sample point is a sample point that has a highest value in the black channel.

30. The color management module according to claim 26, wherein the representative sample point is a sample point that has the highest purity, in the sense that it has the most number of zero channels.

31. The color management module according to claim 24, wherein the checking module determines whether the spectrally-based ICS value is included in the bounding box of the discrete spectral gamut descriptor, and a determination that the spectrally-based ICS value is not included in the bounding box corresponds to a determination that the spectrally-based ICS value is not included in the discrete spectral gamut descriptor, and wherein in response to a determination that the spectrally-based ICS value is included in the bounding box, the checking module further determines whether the spectrally-based ICS value is included in a cell of the discrete spectral gamut descriptor, and a determination that the spectrally-based ICS value is not included in a cell of the discrete spectral gamut descriptor corresponds to a determination that the spectrally-based ICS value is not included in the discrete spectral gamut descriptor.

32. The color management module according to claim 31, wherein the checking module determines whether the spectrally-based ICS value is included in a cell of the discrete spectral gamut descriptor by calculating a cell index for the spectrally-based ICS value based on ICS coordinates of the ICS value, and searches for the calculated cell index in the list of sorted cell indices, wherein a search result indicating that the calculated index is included in the list of cell indices corresponds to a determination that the spectrally-based ICS value is included in a cell of the discrete spectral gamut descriptor.

33. The color management module according to claim 32, wherein a binary search is performed to search for the calculated cell index in the list of sorted cell indices.

34. The color management module according to claim 32, wherein in response to a determination that the spectrally-based ICS value is included in the discrete spectral gamut descriptor, an attribute associated with the calculated index is retrieved, and the spectrally-based ICS value is converted into a destination-side color using the retrieved attribute as an initial guess for the destination-side color.

35. The color management module according to claim 24, wherein the coordinates of the ICS are scaled such that one unit distance in the ICS corresponds to a Just Noticeable Difference (JND), and N is chosen such that the resolution of each cell is a specified multiple of the JND.

36. The color management module according to claim 24, wherein N is chosen such that N is less than an upper bound that is directly related to storage space occupied by the discrete spectral gamut descriptor on a computer-readable storage medium.

37. The color management module according to claim 24, wherein the coordinates of the ICS are scaled such that one unit distance in the ICS corresponds to a Just Noticeable Difference (JND), and wherein N is chosen such that the resolution of each cell is a specified multiple of the JND, and such that N is less than an upper bound that is directly related to storage space occupied by the discrete spectral gamut descriptor on a computer-readable storage medium.

38. The color management module according to claim 24, wherein the gamut mapping module comprises:
- a continuous gamut boundary descriptor module constructed to perform a determining step in which it is determined whether the spectrally-based ICS value is included in a continuous spectral gamut boundary descriptor that represents the continuous spectral gamut boundary of the destination device; and
- a projection module constructed to perform a projecting step, responsive to a determination that the spectrally-based ICS value is not included in the continuous spectral gamut boundary descriptor, in which the spectrally-based ICS color value is projected onto within the continuous spectral gamut of the destination device.

39. The color management module according to claim 24, wherein after performing spectral gamut mapping, it is determined whether the gamut-mapped spectrally-based ICS value is included in the discrete spectral gamut descriptor,
- wherein in response to a determination that the gamut-mapped ICS value is included in the discrete spectral gamut descriptor, an attribute associated with a cell of the discrete spectral gamut descriptor that includes the gamut-mapped ICS value is retrieved, and the gamut-mapped ICS value is converted into a destination-side color using the retrieved attribute as an initial guess for the destination-side color; and
- wherein in response to a determination that the gamut-mapped ICS value is not included in the discrete spectral gamut descriptor, a cell in the discrete spectral gamut descriptor closest to the gamut-mapped ICS value is identified, an attribute associated with the identified cell is retrieved, and the gamut-mapped ICS value is converted into a destination-side color using the retrieved attribute as an initial guess for the destination-side color.

40. The color management module according to claim 23, wherein multi-spectral source devices include multi-spectral digital cameras, and wherein destination devices include multi-ink printers, reflective display devices, and electronic paper.

41. The color management module according to claim 23, further comprising:
- a coarse sampling module constructed to perform a coarse sampling step in which a coarse sampling is performed to generate sample points that sparsely span the destination device dependent color space of the destination device;
- a sample point reflectance conversion module constructed to perform a converting step in which each of the generated sample points is converted into spectral reflectance values in the spectral reflectance space;
- a sample point ICS conversion module constructed to perform a converting step in which the spectral reflectance values are converted into spectrally-based ICS values in the spectrally-based ICS;
- a bounding box calculation module constructed to perform a calculating step in which a maximum coordinate value and a minimum coordinate value in each dimension of the spectrally-based ICS are calculated to define the bounding box that includes the ICS sample points;
- a subdividing module constructed to perform a subdividing step in which the bounding box is subdivided into the collection of discrete cells such that there are N intervals in each dimension;
- a cell index generation module constructed to perform a generating step in which a list of cell indices is generated that represents the collection of discrete cells in the discrete spectral gamut descriptor by performing a finer sampling to generate sample points that densely span the destination device dependent color space of the destination device, in which each sample point generated from the finer sampling is immediately processed, without storing the sample points generated form the finer sampling.

42. The color management module according to claim 41, further comprising a processing module constructed to perform a processing step in which, after a new sample point is generated form the finer sampling, the new sample point is processed by performing the steps of:
converting the generated sample point into a spectral reflectance value in the spectral reflectance space;
converting the spectral reflectance value into a spectrally-based ICS value in the spectrally-based ICS;
determining whether the spectrally-based ICS value is included in the bounding box;
in response to a determination that the spectrally-based ICS value is included in the bounding box, generating a cell index for the ICS sample point based on the ICS coordinate of the sample point, and adding the generated cell index to the list of cell indices; and
associating an attribute with the generated cell index, wherein the attribute provides representative information about sample points included in the cell corresponding to the associated index.

43. The color management module according to claim 23, further comprising:
a gamut descriptor generation module constructed to perform a generating step in which the discrete spectral gamut descriptor is generated that represents the spectral gamut of the destination device as a collection of discrete cells of a subdivided bounding box that includes a set of sample points in the spectrally-based ICS that span the spectral gamut of the destination device, wherein each cell has an attribute that represents an initial guess for a destination-side color for ICS values included in the cell, and the attribute is used to convert ICS values included in the cell into destination-side colors;
a hulling module constructed to perform a hulling step in which a convex hull is generated by applying a hulling algorithm to the set of sample points in the discrete spectral gamut descriptor;
a discrete hull generation module constructed to perform a generating step in which a discrete convex hull is generated that includes the cells in the subdivided bounding box that have a non-empty intersection with the convex hull
wherein the determining step performed by the checking module determines whether a spectrally-based ICS value of the spectrally-based ICS representation is within a spectral gamut of an intended destination device, by determining whether the spectrally-based ICS value is included in the discrete convex hull and the discrete spectral gamut descriptor,
wherein in response to a determination that the spectrally-based ICS value is included in the discrete convex hull, the spectrally-based ICS value is converted into a destination-side color in a destination device dependent color space of the destination device, and
wherein in response to a determination that the spectrally-based ICS value is not included in the discrete convex hull, the spectrally-based ICS color value is spectrally gamut mapped onto the spectral gamut of the destination device, and the gamut-mapped spectrally-based ICS value is converted into a destination-side color in the destination device dependent color space of the destination device.

44. The color management module according to claim 43, wherein the determination as to whether the spectrally-based ICS value is included in the discrete convex hull is performed first before proceeding to a determination as to whether the spectrally-based ICS value is included in the discrete spectral gamut descriptor.

45. A color management apparatus comprising:
a computer-readable memory constructed to store computer-executable process steps; and
a processor constructed to execute the computer-executable process steps stored in the memory;
wherein the process steps stored in the memory cause the processor to convert a source-side color in a source device dependent color space into a counterpart destination-side color in a destination device dependent color space, and include computer-executable process steps to:
access a multi-spectral color image in the source device dependent color space generated using a multi-spectral source device;
convert the multi-spectral color image into a spectral reflectance representation in a spectral reflectance space;
convert the spectral reflectance representation into a spectrally-based Interim Connection Space (ICS) representation in a spectrally-based ICS;
determine whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device;
in response to a determination that the spectrally-based ICS value is included in the discrete spectral gamut descriptor, convert the spectrally-based ICS value into a destination-side color in a destination device dependent color space of the destination device; and
in response to a determination that the spectrally-based ICS value is not included in the discrete spectral gamut descriptor, spectrally gamut map the spectrally-based ICS color value onto the spectral gamut of the destination device, and convert the gamut-mapped spectrally-based ICS value into a destination-side color in the destination device dependent color space of the destination device,
wherein the discrete spectral gamut descriptor represents the spectral gamut of the destination device as a collection of discrete cells of a subdivided bounding box that includes a set of sample points in the spectrally-based ICS that span the spectral gamut of the destination device, and
wherein each cell has an attribute that represents an initial guess for an iterative search for a destination-side color for ICS values included in the cell, and the attribute is used to convert ICS values included in the cell into destination-side colors.

46. The color management apparatus according to claim 45, wherein the discrete spectral gamut descriptor is constructed by performing the steps of:
generating sample points that span the destination device dependent color space of the destination device;
converting each of the generated sample points into spectral reflectance values in the spectral reflectance space;

converting the spectral reflectance values into spectrally-based ICS values in the spectrally-based ICS;

calculating a maximum coordinate value and a minimum coordinate value in each dimension of the spectrally-based ICS to define the bounding box that includes the ICS sample points;

subdividing the bounding box into the collection of discrete cells such that there are N intervals in each dimension;

generating a list of cell indices that represents the collection of discrete cells in the discrete spectral gamut descriptor, wherein the list is generated by generating a cell index for each cell including one or more sample points based on the ICS coordinates of the sample points, and adding the generated cell indices to the list of cell indices;

sorting the list of cell indices; and associating an attribute with each index in the list of cell indices, wherein each attribute provides representative information about sample points included in the cell corresponding to the associated index.

47. The color management apparatus according to claim 46, wherein in the sample point generating step, the sample points are filtered based on specified constraints.

48. The color management apparatus according to claim 46, wherein each attribute is a device value for a representative sample point lying inside the corresponding cell.

49. The color management apparatus according to claim 48, wherein the representative sample point is a sample point that is closest to the center of the cell.

50. The color management apparatus according to claim 48, wherein the representative sample point is a sample point that has a lowest value in the black channel.

51. The color management apparatus according to claim 48, wherein the representative sample point is a sample point that has a highest value in the black channel.

52. The color management apparatus according to claim 48, wherein the representative sample point is a sample point that has the highest purity, in the sense that it has the most number of zero channels.

53. The color management apparatus according to claim 46, wherein in the determining step it is determined whether the spectrally-based ICS value is included in the bounding box of the discrete spectral gamut descriptor, and a determination that the spectrally-based ICS value is not included in the bounding box corresponds to a determination that the spectrally-based ICS value is not included in the discrete spectral gamut descriptor, and wherein in response to a determination that the spectrally-based ICS value is included in the bounding box, it is further determined whether the spectrally-based ICS value is included in a cell of the discrete spectral gamut descriptor, and a determination that the spectrally-based ICS value is not included in a cell of the discrete spectral gamut descriptor corresponds to a determination that the spectrally-based ICS value is not included in the discrete spectral gamut descriptor.

54. The color management apparatus according to claim 53, wherein in the determining step, it is determined whether the spectrally-based ICS value is included in a cell of the discrete spectral gamut descriptor by calculating a cell index for the spectrally-based ICS value based on ICS coordinates of the ICS value, and searching for the calculated cell index in the list of sorted cell indices, wherein a search result indicating that the calculated index is included in the list of cell indices corresponds to a determination that the spectrally-based ICS value is included in a cell of the discrete spectral gamut descriptor.

55. The color management apparatus according to claim 54, wherein a binary search is performed to search for the calculated cell index in the list of sorted cell indices.

56. The color management apparatus according to claim 54, wherein in response to a determination that the spectrally-based ICS value is included in the discrete spectral gamut descriptor, an attribute associated with the calculated index is retrieved, and the spectrally-based ICS value is converted into a destination-side color using the retrieved attribute as an initial guess for the destination-side color.

57. The color management apparatus according to claim 46, wherein the coordinates of the ICS are scaled such that one unit distance in the ICS corresponds to a Just Noticeable Difference (JND), and N is chosen such that the resolution of each cell is a specified multiple of the JND.

58. The color management apparatus according to claim 46, wherein N is chosen such that N is less than an upper bound that is directly related to storage space occupied by the discrete spectral gamut descriptor on a computer-readable storage medium.

59. The color management apparatus according to claim 46, wherein the coordinates of the ICS are scaled such that one unit distance in the ICS corresponds to a Just Noticeable Difference (JND), and wherein N is chosen such that the resolution of each cell is a specified multiple of the JND, and such that N is less than an upper bound that is directly related to storage space occupied by the discrete spectral gamut descriptor on a computer-readable storage medium.

60. The color management apparatus according to claim 46, wherein spectrally gamut mapping the spectrally-based ICS color value onto within the spectral gamut of the destination device comprises the steps of:

determining whether the spectrally-based ICS value is included in a continuous spectral gamut boundary descriptor that represents the continuous spectral gamut boundary of the destination device; and in response to a determination that the spectrally-based ICS value is not included in the continuous spectral gamut boundary descriptor, projecting the spectrally-based ICS color value onto within the continuous spectral gamut of the destination device.

61. The color management apparatus according to claim 46, wherein after performing spectral gamut mapping, it is determined whether the gamut-mapped spectrally-based ICS value is included in the discrete spectral gamut descriptor, wherein in response to a determination that the gamut-mapped ICS value is included in the discrete spectral gamut descriptor, an attribute associated with a cell of the discrete spectral gamut descriptor that includes the gamut-mapped ICS value is retrieved, and the gamut-mapped ICS value is converted into a destination-side color using the retrieved attribute as an initial guess for the destination-side color; and wherein in response to a determination that the gamut-mapped ICS value is not included in the discrete spectral gamut descriptor, a cell in the discrete spectral gamut descriptor closest to the gamut-mapped ICS value is identified, an attribute associated with the identified cell is retrieved, and the gamut-mapped ICS value is converted into a destination-side color using the retrieved attribute as an initial guess for the destination-side color.

62. The color management apparatus according to claim 45, wherein multi-spectral source devices include multi-spectral digital cameras, and wherein destination devices include multi-ink printers, reflective display devices, and electronic paper.

63. The color management apparatus according to claim 45, wherein the discrete spectral gamut descriptor is constructed by performing the steps of:

performing a coarse sampling to generate sample points that sparsely span the destination device dependent color space of the destination device;

converting each of the generated sample points into spectral reflectance values in the spectral reflectance space;

converting the spectral reflectance values into spectrally-based ICS values in the spectrally-based ICS;

calculating a maximum coordinate value and a minimum coordinate value in each dimension of the spectrally-based ICS to define the bounding box that includes the ICS sample points;

subdividing the bounding box into the collection of discrete cells such that there are N intervals in each dimension;

generating a list of cell indices that represents the collection of discrete cells in the discrete spectral gamut descriptor by performing a finer sampling to generate sample points that densely span the destination device dependent color space of the destination device, and immediately processing each sample point generated from the finer sampling, without storing the sample points generated form the finer sampling.

64. The color management apparatus according to claim 63, wherein after a new sample point is generated form the finer sampling, the new sample point is processed by performing the steps of:

converting the generated sample point into a spectral reflectance value in the spectral reflectance space;

converting the spectral reflectance value into a spectrally-based ICS value in the spectrally-based ICS;

determining whether the spectrally-based ICS value is included in the bounding box;

in response to a determination that the spectrally-based ICS value is included in the bounding box, generating a cell index for the ICS sample point based on the ICS coordinate of the sample point, and adding the generated cell index to the list of cell indices; and associating an attribute with the generated cell index, wherein the attribute provides representative information about sample points included in the cell corresponding to the associated index.

65. The color management apparatus according to claim 45, wherein the process steps include computer-executable process steps to:

generate the discrete spectral gamut descriptor that represents the spectral gamut of the destination device as a collection of discrete cells of a subdivided bounding box that includes a set of sample points in the spectrally-based ICS that span the spectral gamut of the destination device, wherein each cell has an attribute that represents an initial guess for a destination-side color for ICS values included in the cell, and the attribute is used to convert ICS values included in the cell into destination-side colors;

generate a convex hull by applying a hulling algorithm to the set of sample points in the discrete spectral gamut descriptor;

generate a discrete convex hull that includes the cells in the subdivided bounding box that have a non-empty intersection with the convex hull, wherein the process step to determine whether a spectrally-based ICS value of the spectrally-based ICS representation is within a spectral gamut of an intended destination device determines whether the spectrally-based ICS value is included in the discrete convex hull and the discrete spectral gamut descriptor, wherein in response to a determination that the spectrally-based ICS value is included in the discrete convex hull, the spectrally-based ICS value is converted into a destination-side color in a destination device dependent color space of the destination device, and wherein in response to a determination that the spectrally-based ICS value is not included in the discrete convex hull, the spectrally-based ICS color value is spectrally gamut mapped onto the spectral gamut of the destination device, and the gamut-mapped spectrally-based ICS value is converted into a destination-side color in the destination device dependent color space of the destination device.

66. The color management apparatus according to claim 65, wherein the determination as to whether the spectrally-based ICS value is included in the discrete convex hull is performed first before proceeding to a determination as to whether the spectrally-based ICS value is included in the discrete spectral gamut descriptor.

67. A non-transitory computer-readable memory medium on which is stored computer-executable process steps for causing a computer to convert a source-side color in a source device dependent color space into a counterpart destination-side color in a destination device dependent color space, said process steps comprising:

accessing a multi-spectral color image in the source device dependent color space generated using a multi-spectral source device;

converting the multi-spectral color image into a spectral reflectance representation in a spectral reflectance space;

converting the spectral reflectance representation into a spectrally-based Interim Connection Space (ICS) representation in a spectrally-based ICS;

determining whether a spectrally-based ICS value of the spectrally-based ICS representation is within a spectral gamut of an intended destination device, by determining whether the spectrally-based ICS value is included in a discrete spectral gamut descriptor that represents the spectral gamut of the destination device;

in response to a determination that the spectrally-based ICS value is included in the discrete spectral gamut descriptor, converting the spectrally-based ICS value into a destination-side color in a destination device dependent color space of the destination device; and in response to a determination that the spectrally-based ICS value is not included in the discrete spectral gamut descriptor, spectrally gamut mapping the spectrally-based ICS color value onto the spectral gamut of the destination device, and converting the gamut-mapped spectrally-based ICS value into a destination-side color in the destination device dependent color space of the destination device, wherein the discrete spectral gamut descriptor represents the spectral gamut of the destination device as a collection of discrete cells of a subdivided bounding box that includes a set of sample points in the spectrally-based ICS that span the spectral gamut of the destination device, and wherein each cell has an attribute that represents an initial guess for an iterative search for a destination-side color for ICS values included in the cell, and the attribute is used to convert ICS values included in the cell into destination-side colors.

68. The computer-readable memory medium according to claim 67, wherein the discrete spectral gamut descriptor is constructed by performing the steps of:
  generating sample points that span the destination device dependent color space of the destination device;
  converting each of the generated sample points into spectral reflectance values in the spectral reflectance space;
  converting the spectral reflectance values into spectrally-based ICS values in the spectrally-based ICS;
  calculating a maximum coordinate value and a minimum coordinate value in each dimension of the spectrally-based ICS to define the bounding box that includes the ICS sample points;
  subdividing the bounding box into the collection of discrete cells such that there are N intervals in each dimension;
  generating a list of cell indices that represents the collection of discrete cells in the discrete spectral gamut descriptor, wherein the list is generated by generating a cell index for each cell including one or more sample points based on the ICS coordinates of the sample points, and adding the generated cell indices to the list of cell indices;
  sorting the list of cell indices; and
  associating an attribute with each index in the list of cell indices, wherein each attribute provides information about sample points included in the cell corresponding to the associated index.

69. The computer-readable memory medium according to claim 68, wherein in the sample point generating step, the sample points are filtered based on specified constraints.

70. The computer-readable memory medium according to claim 68, wherein each attribute is a device value for a representative sample point lying inside the corresponding cell.

71. The computer-readable memory medium according to claim 70, wherein the representative sample point is a sample point that is closest to the center of the cell.

72. The computer-readable memory medium according to claim 70, wherein the representative sample point is a sample point that has a lowest value in the black channel.

73. The computer-readable memory medium according to claim 70, wherein the representative sample point is a sample point that has a highest value in the black channel.

74. The computer-readable memory medium according to claim 70, wherein the representative sample point is a sample point that has the highest purity, in the sense that it has the most number of zero channels.

75. The computer-readable memory medium according to claim 68, wherein in the determining step it is determined whether the spectrally-based ICS value is included in the bounding box of the discrete spectral gamut descriptor, and a determination that the spectrally-based ICS value is not included in the bounding box corresponds to a determination that the spectrally-based ICS value is not included in the discrete spectral gamut descriptor, and wherein in response to a determination that the spectrally-based ICS value is included in the bounding box, it is further determined whether the spectrally-based ICS value is included in a cell of the discrete spectral gamut descriptor, and a determination that the spectrally-based ICS value is not included in a cell of the discrete spectral gamut descriptor corresponds to a determination that the spectrally-based ICS value is not included in the discrete spectral gamut descriptor.

76. The computer-readable memory medium according to claim 75, wherein in the determining step, it is determined whether the spectrally-based ICS value is included in a cell of the discrete spectral gamut descriptor by calculating a cell index for the spectrally-based ICS value based on ICS coordinates of the ICS value, and searching for the calculated cell index in the list of sorted cell indices, wherein a search result indicating that the calculated index is included in the list of cell indices corresponds to a determination that the spectrally-based ICS value is included in a cell of the discrete spectral gamut descriptor.

77. The computer-readable memory medium according to claim 76, wherein a binary search is performed to search for the calculated cell index in the list of sorted cell indices.

78. The computer-readable memory medium according to claim 76, wherein in response to a determination that the spectrally-based ICS value is included in the discrete spectral gamut descriptor, an attribute associated with the calculated index is retrieved, and the spectrally-based ICS value is converted into a destination-side color using the retrieved attribute as an initial guess for the destination-side color.

79. The computer-readable memory medium according to claim 68, wherein the coordinates of the ICS are scaled such that one unit distance in the ICS corresponds to a Just Noticeable Difference (JND), and N is chosen such that the resolution of each cell is a specified multiple of the JND.

80. The computer-readable memory medium according to claim 68, wherein N is chosen such that N is less than an upper bound that is directly related to storage space occupied by the discrete spectral gamut descriptor on a computer-readable storage medium.

81. The computer-readable memory medium according to claim 68, wherein the coordinates of the ICS are scaled such that one unit distance in the ICS corresponds to a Just Noticeable Difference (JND), and wherein N is chosen such that the resolution of each cell is a specified multiple of the JND, and such that N is less than an upper bound that is directly related to storage space occupied by the discrete spectral gamut descriptor on a computer-readable storage medium.

82. The computer-readable memory medium according to claim 68, wherein spectrally gamut mapping the spectrally-based ICS color value onto within the spectral gamut of the destination device comprises the steps of:
  determining whether the spectrally-based ICS value is included in a continuous spectral gamut boundary descriptor that represents the continuous spectral gamut boundary of the destination device; and
  in response to a determination that the spectrally-based ICS value is not included in the continuous spectral gamut boundary descriptor, projecting the spectrally-based ICS color value onto within the continuous spectral gamut of the destination device.

83. The computer-readable memory medium according to claim 68, wherein after performing spectral gamut mapping, it is determined whether the gamut-mapped spectrally-based ICS value is included in the discrete spectral gamut descriptor,
  wherein in response to a determination that the gamut-mapped ICS value is included in the discrete spectral gamut descriptor, an attribute associated with a cell of the discrete spectral gamut descriptor that includes the gamut-mapped ICS value is retrieved, and the gamut-mapped ICS value is converted into a destination-side color using the retrieved attribute as an initial guess for the destination-side color; and
  wherein in response to a determination that the gamut-mapped ICS value is not included in the discrete spectral gamut descriptor, a cell in the discrete spectral gamut descriptor closest to the gamut-mapped ICS value is identified, an attribute associated with the identified cell is retrieved, and the gamut-mapped ICS value is converted into a destination-side color using the retrieved attribute as an initial guess for the destination-side color.

84. The computer-readable memory medium according to claim 67, wherein multi-spectral source devices include multi-spectral digital cameras, and wherein destination devices include multi-ink printers, reflective display devices, and electronic paper.

85. The computer-readable memory medium according to claim 67, wherein the discrete spectral gamut descriptor is constructed by performing the steps of:
   performing a coarse sampling to generate sample points that sparsely span the destination device dependent color space of the destination device;
   converting each of the generated sample points into spectral reflectance values in the spectral reflectance space;
   converting the spectral reflectance values into spectrally-based ICS values in the spectrally-based ICS;
   calculating a maximum coordinate value and a minimum coordinate value in each dimension of the spectrally-based ICS to define the bounding box that includes the ICS sample points;
   subdividing the bounding box into the collection of discrete cells such that there are N intervals in each dimension;
   generating a list of cell indices that represents the collection of discrete cells in the discrete spectral gamut descriptor by performing a finer sampling to generate sample points that densely span the destination device dependent color space of the destination device, and immediately processing each sample point generated from the finer sampling, without storing the sample points generated form the finer sampling.

86. The computer-readable memory medium according to claim 85, wherein after a new sample point is generated form the finer sampling, the new sample point is processed by performing the steps of:
   converting the generated sample point into a spectral reflectance value in the spectral reflectance space;
   converting the spectral reflectance value into a spectrally-based ICS value in the spectrally-based ICS;
   determining whether the spectrally-based ICS value is included in the bounding box;
   in response to a determination that the spectrally-based ICS value is included in the bounding box, generating a cell index for the ICS sample point based on the ICS coordinate of the sample point, and adding the generated cell index to the list of cell indices; and
   associating an attribute with the generated cell index, wherein the attribute provides representative information about sample points included in the cell corresponding to the associated index.

87. The computer-readable memory medium according to claim 67, wherein the process steps further comprise:
   generating the discrete spectral gamut descriptor that represents the spectral gamut of the destination device as a collection of discrete cells of a subdivided bounding box that includes a set of sample points in the spectrally-based ICS that span the spectral gamut of the destination device, wherein each cell has an attribute that represents an initial guess for a destination-side color for ICS values included in the cell, and the attribute is used to convert ICS values included in the cell into destination-side colors;
   generating a convex hull by applying a hulling algorithm to the set of sample points in the discrete spectral gamut descriptor;
   generating a discrete convex hull that includes the cells in the subdivided bounding box that have a non-empty intersection with the convex hull,
   wherein the step of determining whether a spectrally-based ICS value of the spectrally-based ICS representation is within a spectral gamut of an intended destination device determines whether the spectrally-based ICS value is included in the discrete convex hull and the discrete spectral gamut descriptor,
   wherein in response to a determination that the spectrally-based ICS value is included in the discrete convex hull, the spectrally-based ICS value is converted into a destination-side color in a destination device dependent color space of the destination device, and
   wherein in response to a determination that the spectrally-based ICS value is not included in the discrete convex hull, the spectrally-based ICS color value is spectrally gamut mapped onto the spectral gamut of the destination device, and the gamut-mapped spectrally-based ICS value is converted into a destination-side color in the destination device dependent color space of the destination device.

88. The computer-readable memory medium according to claim 87, wherein the determination as to whether the spectrally-based ICS value is included in the discrete convex hull is performed first before proceeding to a determination as to whether the spectrally-based ICS value is included in the discrete spectral gamut descriptor.

* * * * *